(12) United States Patent
Benbrahim et al.

(10) Patent No.: US 7,510,478 B2
(45) Date of Patent: Mar. 31, 2009

(54) GAMING APPARATUS SOFTWARE EMPLOYING A SCRIPT FILE

(75) Inventors: Jamal Benbrahim, Reno, NV (US); Robert E. Breckner, Reno, NV (US); Steven G. LeMay, Reno, NV (US); Alexey Kryuchkov, Reno, NV (US); Gregory A. Schlottmann, Sparks, NV (US)

(73) Assignee: IGT, Reno, NV (US)

( * ) Notice: Subject to any disclaimer, the term of this patent is extended or adjusted under 35 U.S.C. 154(b) by 1411 days.

(21) Appl. No.: 10/659,821

(22) Filed: Sep. 11, 2003

(65) Prior Publication Data

US 2005/0059453 A1 Mar. 17, 2005

(51) Int. Cl.
  *A63F 13/00* (2006.01)
  *A63F 9/24* (2006.01)
  *G06F 17/00* (2006.01)
  *G06F 19/00* (2006.01)

(52) U.S. Cl. .............................. 463/43; 463/16; 463/22; 463/42

(58) Field of Classification Search ............. 463/16–25, 463/29, 30, 40–43
See application file for complete search history.

(56) References Cited

U.S. PATENT DOCUMENTS 4,747,127 A 5/1988 Hansen et al.

(Continued)

FOREIGN PATENT DOCUMENTS

EP 0 710 909 A1 5/1996

(Continued)

OTHER PUBLICATIONS

Ash Matheson, "An Introduction to Lua," GameDev.net, posted Apr. 30, 2003 Retrieved from the Internet on Apr. 20, 2007: <URL: http://www.gamedev.net/reference/articles/article1932.asp>.

(Continued)

*Primary Examiner*—Robert E Pezzuto
*Assistant Examiner*—Binh-An D Nguyen
(74) *Attorney, Agent, or Firm*—Weaver Austin Villeneuve Sampson LLP

(57) ABSTRACT

In a gaming method, a wager may be received from a player via a value input device of a gaming apparatus, and an image representative of a game may be generated for display on a display unit of the gaming apparatus. Compiled code associated with play of the game may be executed using a processor of the apparatus, and the compiled code may include code to read data from a file stored in a memory of the gaming apparatus, wherein the file is separate from the compiled code. First uncompiled instruction data may be read from the file using the compiled code, the first uncompiled instruction data indicative of a request to create a first software object associated with play of the game. The first software object may be created using the compiled code in response to the uncompiled first instruction data. Second uncompiled instruction data may be from the file using the compiled code, the second uncompiled instruction data indicative of a request to create a second software object associated with play of the game. The second software object may be created using the compiled code in response to the second uncompiled instruction data. Third uncompiled instruction data may be read from the file after creation of the second software object using the compiled code, wherein the third uncompiled instruction data includes a reference to the first software object, wherein the third uncompiled instruction data is indicative of a request to perform an operation associated with play of the game and associated with the first software object. In response to the third uncompiled instruction data, the operation indicated by the third uncompiled instruction data may be performed using the compiled code. A value payout associated with an outcome of the game may be determined.

34 Claims, 22 Drawing Sheets

U.S. PATENT DOCUMENTS

| | | | |
|---|---|---|---|
| 5,210,876 A | | 5/1993 | Uchida |
| 5,404,528 A * | | 4/1995 | Mahajan ..................... 719/320 |
| 5,675,804 A * | | 10/1997 | Sidik et al. .................. 717/139 |
| 6,409,602 B1 | | 6/2002 | Wiltshire et al. |
| 6,471,588 B2 * | | 10/2002 | Sakamoto ..................... 463/20 |
| 6,609,974 B2 * | | 8/2003 | Mead et al. ................... 463/25 |
| 6,666,766 B2 * | | 12/2003 | Baerlocher et al. ............ 463/16 |
| 7,314,408 B2 * | | 1/2008 | Cannon ........................ 463/16 |
| 2003/0064808 A1 | | 4/2003 | Hecht et al. |

FOREIGN PATENT DOCUMENTS

| | | |
|---|---|---|
| EP | 1 113 407 A2 | 7/2001 |
| EP | 1113407 | 7/2001 |
| WO | WO 98/30954 | 7/1998 |

OTHER PUBLICATIONS

UK Examination Report for Application No. GB0419334.8, dated Dec. 20, 2006.

"ECMA Script Language Specification," Dec. 1999, ECMA, available at http://www.bbassett.net/njs/e262-3.pdf.

Lerusalimschy et al., "Lua- an extensible extension language", reprinted from *Software: Practice & Experience*, vol. 26, No. 6, pp. 635-652 (1996), available at http://www.lua.org/spe.html.

Matheson, A.: "An Introduction to Lua" 19 pages, posted to GameDev.net on Apr. 30, 2003.

Office Action in corresponding application No. GB 0419334.8 dated Apr. 27, 2006.

Search Report dated Oct. 27, 2004 issued by the Patent Office of Great Britain re Application No. GB0419334.8.

Hal Helms, "Build a simple Mach-II application: consider this when flexibility and maintainability are important goals of your system—foundations," ColdFusion Developer's Journal, Oct. 2003, http://www.findarticles.com/p/articles/mi_m0MLU/is_10_5/ai_109039755.

Nancy Winnick Cluts, "All About Scripting," Microsoft Corporation, Oct. 27, 1997, http://msdn.microsoft.com/library/en-us/dnscrpt/html/allabout.asp?frame=true.

Australian Government, IP Australia; "Examiner's First Report On Patent Application No. 2004206977;" dated Oct. 25, 2006, 2 pages.

* cited by examiner

FIG. 27

```
000000  48 44 52 5F 59 03 00 00  41 56 50 46 01 00 00 00  HDR_Y...AVPF....
000010  52 45 4D 2B 25 00 00 00  20 54 68 69 73 20 69 73  REM+%... This is
000020  20 61 20 43 2B 2B 20 73  74 79 6C 65 20 6F 6E 65   a C++ style one
000030  20 6C 69 6E 65 20 72 65  6D 61 72 6B 00 52 45 4D   line remark.REM
000040  5F 45 00 00 00 20 20 20  54 68 69 73 20 69 73 20  _E...   This is
000050  61 20 43 20 73 74 79 6C  65 20 6D 75 6C 74 69 2D  a C style multi-
000060  6C 69 6E 65 20 72 65 6D  61 72 6B 2E 0D 0A 20 20  line remark...
000070  20 20 20 54 68 69 73 20  69 73 20 61 20 73 65 63     This is a sec
000080  6F 6E 64 20 6C 69 6E 65  20 00 52 45 4D 2B 24 00  ond line .REM+$.
000090  00 00 20 4F 6E 6C 79 20  67 6C 6F 62 61 6C 20 73  .. Only global s
0000a0  74 72 75 63 74 75 72 65  73 20 61 72 65 20 61 6C  tructures are al
0000b0  6C 6F 77 65 64 00 4E 41  4D 45 59 00 00 00 53 54  lowed.NAMEY...ST
0000c0  52 47 0B 00 00 00 53 74  72 75 63 74 75 72 65 31  RG....Structure1
0000d0  00 49 38 5F 5F 02 00 00  00 01 02 44 42 4C 5F 10  .I8__......DBL_.
0000e0  00 00 00 00 00 00 00 00  80 08 40 00 00 00 00 00  ..........@.....
0000f0  00 10 40 49 33 32 5F 04  00 00 00 03 00 00 00 49  ..@I32_........I
000100  33 32 5F 04 00 00 00 04  00 00 00 49 33 32 5F 04  32_........I32_.
000110  00 00 00 05 00 00 00 52  45 4D 2B 27 00 00 00 20  .......REM+'... 
000120  54 68 69 73 20 69 73 20  75 6E 6E 61 6D 65 64 20  This is unnamed 
000130  6F 62 6A 65 63 74 20 6F  66 20 74 79 70 65 20 41  object of type A
000140  63 74 6F 72 2E 00 4F 42  4A 5F 2C 00 00 00 53 54  ctor..OBJ_,...ST
000150  52 47 06 00 00 00 41 63  74 6F 72 00 46 55 4E 43  RG....Actor.FUNC
000160  16 00 00 00 53 54 52 47  05 00 00 00 73 68 6F 77  ....STRG....show
000170  00 42 4F 4F 4C 01 00 00  00 01 4F 42 4A 5F 56 00  .BOOL.....OBJ_V.
000180  00 00 53 54 52 47 06 00  00 00 41 63 74 6F 72 00  ..STRG....Actor.
000190  53 54 52 47 0B 00 00 00  46 69 72 73 74 41 63 74  STRG....FirstAct
0001a0  6F 72 00 46 55 4E 43 2D  00 00 00 53 54 52 47 09  or.FUNC-...STRG.
0001b0  00 00 00 61 64 64 56 65  72 74 73 00 55 53 45 5F  ...addVerts.USE_
0001c0  0B 00 00 00 53 74 72 75  63 74 75 72 65 31 00 42  ....Structure1.B
0001d0  4F 4F 4C 01 00 00 00 01  4F 42 4A 5F 81 01 00 00  OOL.....OBJ_....
0001e0  53 54 52 47 06 00 00 00  41 63 74 6F 72 00 53 54  STRG....Actor.ST
0001f0  52 47 0C 00 00 00 53 65  63 6F 6E 64 41 63 74 6F  RG....SecondActo
000200  72 00 52 45 4D 2B 22 00  00 00 20 41 64 64 20 41  r.REM+"... Add A
000210  63 74 6F 72 20 77 69 74  68 20 6E 61 6D 65 20 20  ctor with name  
000220  46 69 72 73 74 41 63 74  6F 72 22 00 46 55 4E 43  FirstActor".FUNC
000230  24 00 00 00 53 54 52 47  09 00 00 00 61 64 64 41  $...STRG....addA
000240  63 74 6F 72 00 55 53 45  5F 0B 00 00 00 46 69 72  ctor.USE_....Fir
000250  73 74 41 63 74 6F 72 00  52 45 4D 2B 29 00 00 00  stActor.REM+)...
000260  20 43 72 65 61 74 65 20  6F 62 6A 65 63 74 20 50   Create object P
000270  69 76 6F 74 41 74 74 72  69 62 75 74 65 20 28 22  ivotAttribute ("
000280  50 69 76 6F 74 31 22 29  00 4F 42 4A 5F 88 00 00  Pivot1").OBJ_...
000290  00 53 54 52 47 0F 00 00  00 50 69 76 6F 74 41 74  .STRG....PivotAt
0002a0  74 72 69 62 75 74 65 00  53 54 52 47 07 00 00 00  tribute.STRG....
0002b0  50 69 76 6F 74 31 00 52  45 4D 2B 25 00 00 00 20  Pivot1.REM+%... 
0002c0  50 61 72 65 6E 74 20 74  68 69 73 20 6F 62 6A 65  Parent this obje
0002d0  63 74 20 74 6F 20 22 53  65 63 6F 6E 64 41 63 74  ct to "SecondAct
0002e0  6F 72 22 00 43 41 4C 4C  2D 00 00 00 53 54 52 47  or".CALL-...STRG
0002f0  0C 00 00 00 53 65 63 6F  6E 64 41 63 74 6F 72 00  ....SecondActor.
000300  53 54 52 47 09 00 00 00  61 64 64 50 69 76 6F 74  STRG....addPivot
000310  00 54 48 49 53 00 00 00  00 43 41 4C 4C 40 00 00  .THIS....CALL@..
000320  00 53 54 52 47 0B 00 00  00 46 69 72 73 74 41 63  .STRG....FirstAc
000330  74 6F 72 00 53 54 52 47  09 00 00 00 61 64 64 56  tor.STRG....addV
000340  65 72 74 73 00 55 53 45  5F 0B 00 00 00 53 74 72  erts.USE_....Str
000350  75 63 74 75 72 65 31 00  42 4F 4F 4C 01 00 00 00  ucture1.BOOL....
000360  00
```

GAMING APPARATUS SOFTWARE EMPLOYING A SCRIPT FILE

BACKGROUND

The present disclosure is generally related to gaming machines such as reel-type or video slot machines, video poker machines, etc., and more particularly, to systems and techniques for configuring gaming machines.

A typical gaming machine includes a processor that can be used to configure visual displays of the gaming machine (e.g., e.g., a video display), audio generated by the gaming machine, game play, etc. The processor is under control of machine-executable code stored in a memory of the gaming machine. Some or all of the machine-executable code is usually generated by first writing program instructions in a high-level programming language such as C++. The program instructions in the high-level programming language may be included in multiple files corresponding to different aspects of operation of the gaming machine. Then, the program instructions in the high-level programming language are compiled into the machine-executable code (i.e., compiled code). This may include a linking procedure where program instructions included in different program segments and/or stored in multiple files are linked together in a well known manner. Typically, gaming regulators require that the operation of compiled code be tested and verified before it can be deployed in a gaming machine in casino.

If it is desired to change the configuration of the gaming machine (for example, to modify video displayed on, or audio generated by, the gaming machine), the program in the high-level programming language must be modified. Then, the compiling and linking procedure are employed to generate the compiled code. Because portions of the program in the high-level programming language that correspond to core functionality of the gaming machine are critical, these portions must be kept in a secure environment. The compiling and/or linking procedure typically requires access to the critical portions of the program, and thus this procedure may also need to take place in a secure environment. Additionally, before the new compiled code can be deployed in a gaming machine in casino, gaming regulators may need to test and verify the compiled code. Therefore, even changes to non-critical portions of the program (e.g., audio generation) and/or minor changes may involve considerable time and expense.

A different approach is to include most functionality of a program in machine-executable code, but to put some of the program's functionality in a "script file," where the script file includes instructions written in a high-level scripting language. Typically, the script file itself must be compiled using a script file compiler. Then, at run-time, a "virtual machine" executes the compiled script file. To debug the script file, a special debugging tool set is used. Thus, this approach requires two different compilers (one for the main portion of the program and one for the script file) and, similarly, two different sets of debugging tools.

SUMMARY

In one embodiment, a gaming method is provided. The method may comprise receiving a wager from a player via a value input device of a gaming apparatus, and generating an image representative of a game for display on a display unit of the gaming apparatus. The method may also comprise executing compiled code associated with play of the game using a processor of the apparatus, the compiled code including code to read data from a file stored in a memory of the gaming apparatus, wherein the file is separate from the compiled code. The method additionally may comprise reading, using the compiled code, first uncompiled instruction data from the file, the first uncompiled instruction data indicative of a request to create a first software object associated with play of the game, and creating the first software object using the compiled code in response to the uncompiled first instruction data. The method may further comprise reading second uncompiled instruction data from the file, the second uncompiled instruction data indicative of a request to create a second software object associated with play of the game, and creating the second software object using the compiled code in response to the second uncompiled instruction data. The method may still further comprise reading third uncompiled instruction data from the file after creation of the second software object, wherein the third uncompiled instruction data includes a reference to the first software object, wherein the third uncompiled instruction data is indicative of a request to perform an operation associated with play of the game and associated with the first software object, and performing, in response to the third uncompiled instruction data, the operation indicated by the third uncompiled instruction data using the compiled code. The method may also comprise determining a value payout associated with an outcome of the game.

In another embodiment, a gaming apparatus is provided. The gaming apparatus may include a display unit, a value input device, and a controller operatively coupled to the display unit and the value input device. The controller may comprise a processor and a memory operatively coupled to the processor, wherein the memory includes compiled code and a file separate from the compiled code. The controller may be programmed to receive wager data from the value input device, the wager data indicative of a wager submitted by a player, and to generate an image representative of a game for display on the display unit. The controller may be programmed according to the compiled code to read first uncompiled instruction data from the file, the first uncompiled instruction data indicative of a request to create a first software object associated with play of the game, and to create the first software object in response to the first uncompiled instruction data. The controller additionally may be programmed according to the compiled code to read second uncompiled instruction data from the file, the second uncompiled instruction data indicative of a request to create a second software object associated with play of the game, and to create the second software object in response to the second uncompiled instruction data. The controller may also be programmed according to the compiled code to read third uncompiled instruction data from the file after creation of the second software object, wherein the third uncompiled instruction data includes a reference to the first software object, wherein the third uncompiled instruction data is indicative of a request to perform an operation associated with play of the game and associated with the first software object, and to perform the operation in response to the third instruction data. The controller may be programmed to determine a value payout associated with an outcome of the game.

In yet another embodiment, another gaming method is provided. The method may comprise receiving a wager from a player via a value input device of a gaming apparatus, and generating an image representative of a game for display on a display unit of the gaming apparatus. The method additionally may comprise executing compiled code associated with play of the game using a processor of the apparatus, the compiled code including code to read data from a file stored in a memory of the gaming apparatus, wherein the file is separate from the compiled code. The method may also comprise reading, using the compiled code, first uncompiled instruction data from the file, the first uncompiled instruction data indicative of a request to create a data structure associated with play of the game, and creating the data structure using the compiled code in response to the uncompiled first instruction data. The method may further comprise reading second uncompiled instruction data from the file, wherein the second uncompiled instruction data includes a reference to the data structure, wherein the second uncompiled instruction data is indicative of a request to perform an operation associated with play of the game and associated with the data structure, and performing, in response to the second uncompiled instruction data, the operation indicated by the second uncompiled instruction data using the compiled code and the data structure. The method may still further comprise determining a value payout associated with an outcome of the game.

In still another embodiment, another gaming apparatus is provided. The gaming apparatus may include a display unit, a value input device, and a controller operatively coupled to the display unit and the value input device. The controller may comprise a processor and a memory operatively coupled to the processor, wherein the memory includes compiled code and a file separate from the compiled code. The controller may be programmed to receive wager data from the value input device, the wager data indicative of a wager submitted by a player, and to generate an image representative of a game for display on the display unit. The controller may be programmed according to the compiled code to read first uncompiled instruction data from the file, the first uncompiled instruction data indicative of a request to create a data structure associated with play of the game, and to create the data structure in response to the first uncompiled instruction data. The controller may also be being programmed according to the compiled code to read second uncompiled instruction data from the file, the second uncompiled instruction data indicative of a request to create a second software object associated with play of the game, and to create the second software object in response to the second uncompiled instruction data. The controller additionally may be programmed according to the compiled code to read second uncompiled instruction data from the file, wherein the second uncompiled instruction data includes a reference to the data structure, wherein the second uncompiled instruction data is indicative of a request to perform an operation associated with play of the game and associated with the data structure, and to perform the operation in response to the second instruction data using the data structure. The controller may also be programmed to determine a value payout associated with an outcome of the game.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 27 is a listing of an example script file in a binary format.

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
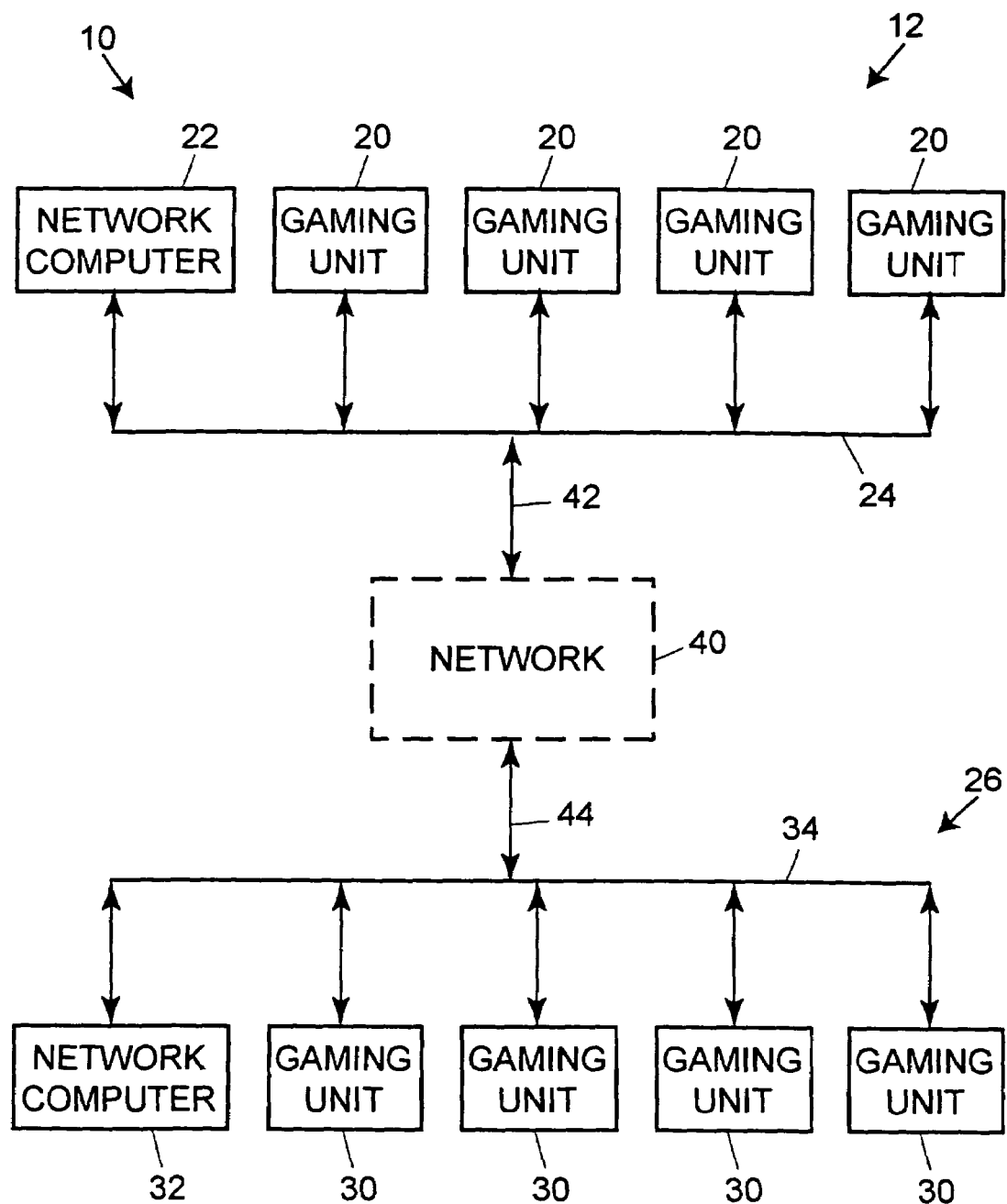
FIG. 1 is a block diagram of an embodiment of a gaming system.

FIG. 1 illustrates one possible embodiment of a casino gaming system 10 in accordance with the invention. Referring to FIG. 1, the casino gaming system 10 may include a first group or network 12 of casino gaming units 20 operatively coupled to a network computer 22 via a network data link or bus 24. The casino gaming system 10 may include a second group or network 26 of casino gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may provided as a dedicated hardwired link or a wireless link. Although the data link 24 is shown as a single data link 24, the data link 24 may comprise multiple data links.

Figure 2:
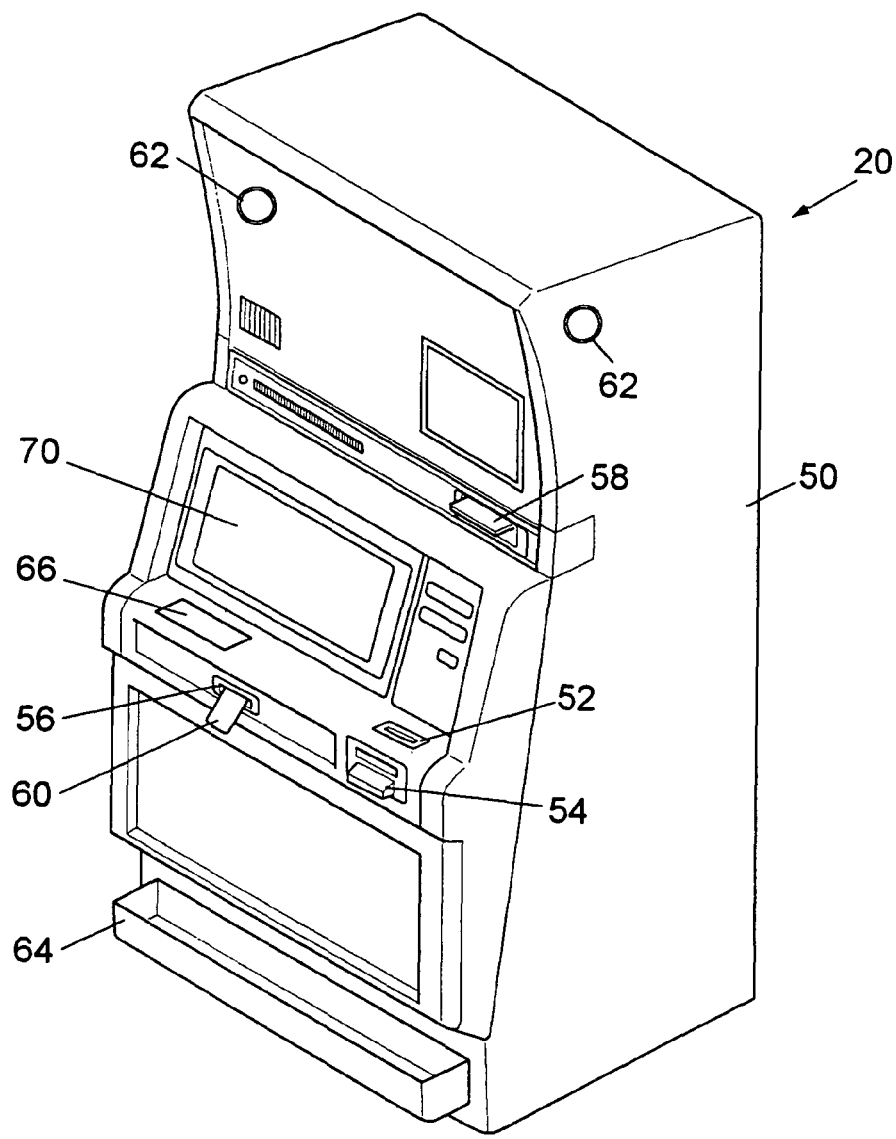
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 2, the casino gaming unit 20 may include a housing or cabinet 50 and one or more input devices, which may include a coin slot or acceptor 52, a paper currency acceptor 54, a ticket reader/printer 56 and a card reader and/or writer 58 (hereinafter "card reader/writer 58"), which may be used to input value to the gaming unit 20. A value input device may include any device that can accept value from a customer. As used herein, the term "value" may encompass gaming tokens, coins, paper currency, ticket vouchers, credit or debit cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader/writer 58 may include any type of card reading device, such as a magnetic card reader or an optical card reader, and may be used to read data from a card offered by a player, such as a credit card or a player tracking card. The card reader/writer 58 may also include any type of card writing device, such as a magnetic card writer or an optical card writer, and may be used to write data to a card offered by a player, such as a credit card or a player tracking card. If provided for player tracking purposes, the card reader/ writer 58 may be used to read data from, and/or write data to, player tracking cards that are capable of storing data representing the identity of a player, the identity of a casino, the player's gaming habits, etc.

The gaming unit 20 may include one or more audio speakers 62, a coin payout tray 64, an input control panel 66 and a display unit 70 for displaying display data relating to the game or games provided by the gaming unit 20. The audio speakers 62 may generate audio representing sounds such as the noise of spinning slot machine reels, a dealer's voice, music, announcements or any other audio related to a casino game. The input control panel 66 may be provided with a plurality of pushbuttons or touch-sensitive areas that may be pressed by a player to select games, make wagers, make gaming decisions, etc. The display unit 70 may include one or more two dimensional display units such as a video display unit displaying images, a numeric display, etc. Additionally or alternatively, the display unit 70 may include one or more three dimensional display units such as mechanical reels, a holographic display, a stereoscopic display, a three dimensional display volume, etc.

Figure 2A:
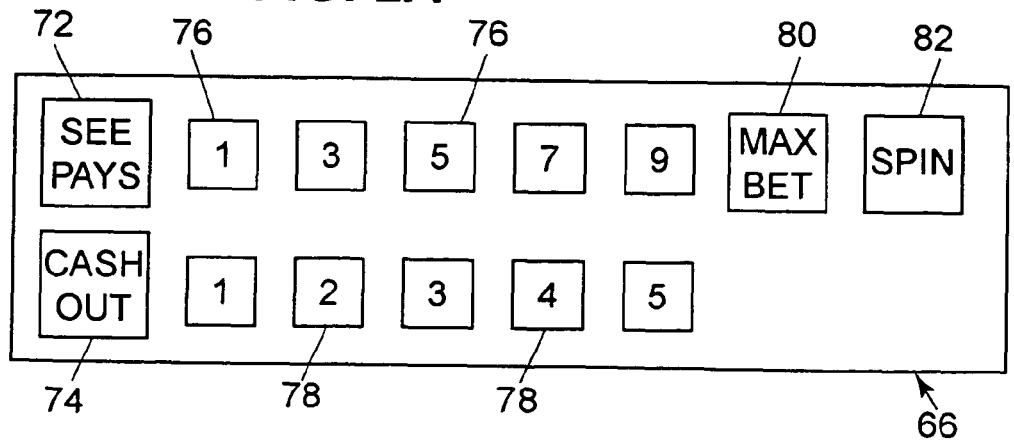
FIG. 2A illustrates an embodiment of a control panel for a gaming unit.

FIG. 2A illustrates one possible embodiment of the control panel 66, which may be used where the gaming unit 20 is a slot machine having a plurality of mechanical or "virtual" reels. Referring to FIG. 2A, the control panel 66 may include a "See Pays" button 72 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 2A, a rectangle is shown around the buttons 72, 74, 76, 78, 80, 82. It should be understood that that rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. Although the control panel 66 is shown to be separate from the display unit 70, it should be understood that the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen.

Gaming Unit Electronics

Figure 3:
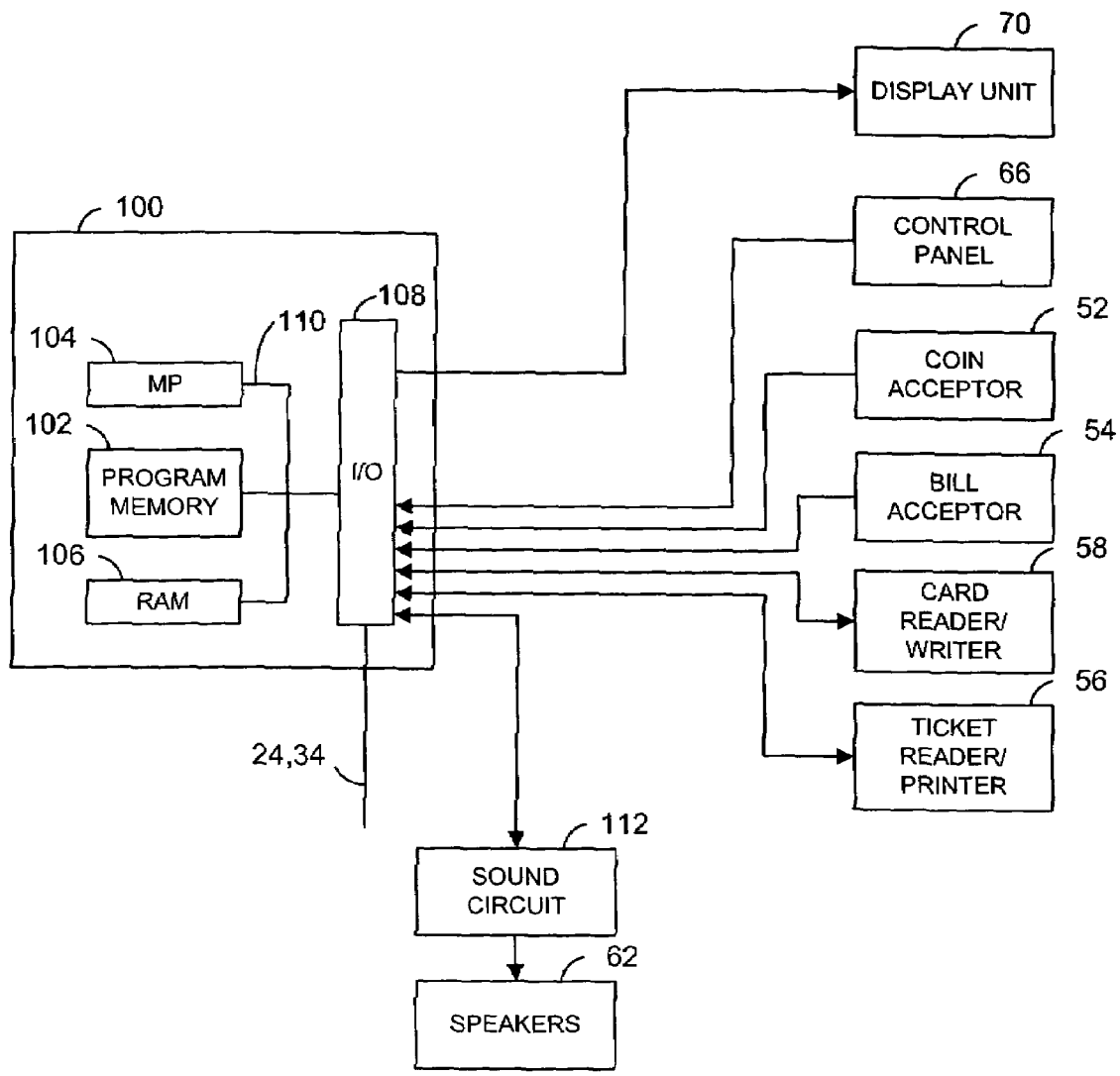
FIG. 3 is a block diagram of the electronic components of a gaming unit of FIG. 2.

FIG. 3 is a block diagram of a number of components that may be incorporated in the gaming unit 20. Referring to FIG. 3, the gaming unit 20 may include a controller 100 that may comprise a program memory 102, a microcontroller or microprocessor (MP) 104, a random-access memory (RAM) 106, and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memory (or memories) 102 may be implemented as semiconductor memories, magnetically readable memories, and/or optically readable memories, for example.

The program memory 102 may comprise a read-only memory (ROM), a read/write or alterable memory, such as a hard disk, a flash memory, an erasable programmable read-only memory (EPROM), an electrically erasable programmable read-only memory (EEPROM), etc. In the event a hard disk is used as a program memory, the address/data bus 110 shown schematically in FIG. 3 may comprise multiple address/data buses, which may be of different types, and there may be an I/O circuit disposed between the address/data buses.

FIG. 3 illustrates that the control panel 66, the coin acceptor 52, the bill acceptor 54, the card reader 58, the ticket reader/printer 56 and the display unit 70 may be operatively coupled to the I/O circuit 108, each of those components being so coupled by either a unidirectional or bidirectional, single-line or multiple-line data link, which may depend on the design of the component that is used. The links may each comprise a serial communication link and/or a parallel communication link. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 3, the components 52, 54, 56, 58, 66, 70, and 112 may be connected to the I/O circuit 108 via one or more respective direct lines or conductors. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C+, C++ or the like or any low-level, assembly or machine language. By storing the computer program portions therein, various portions of the memory or memories 102, 106 of the controller 100 are physically and/or structurally configured in accordance with computer program instructions.

Figure 4:
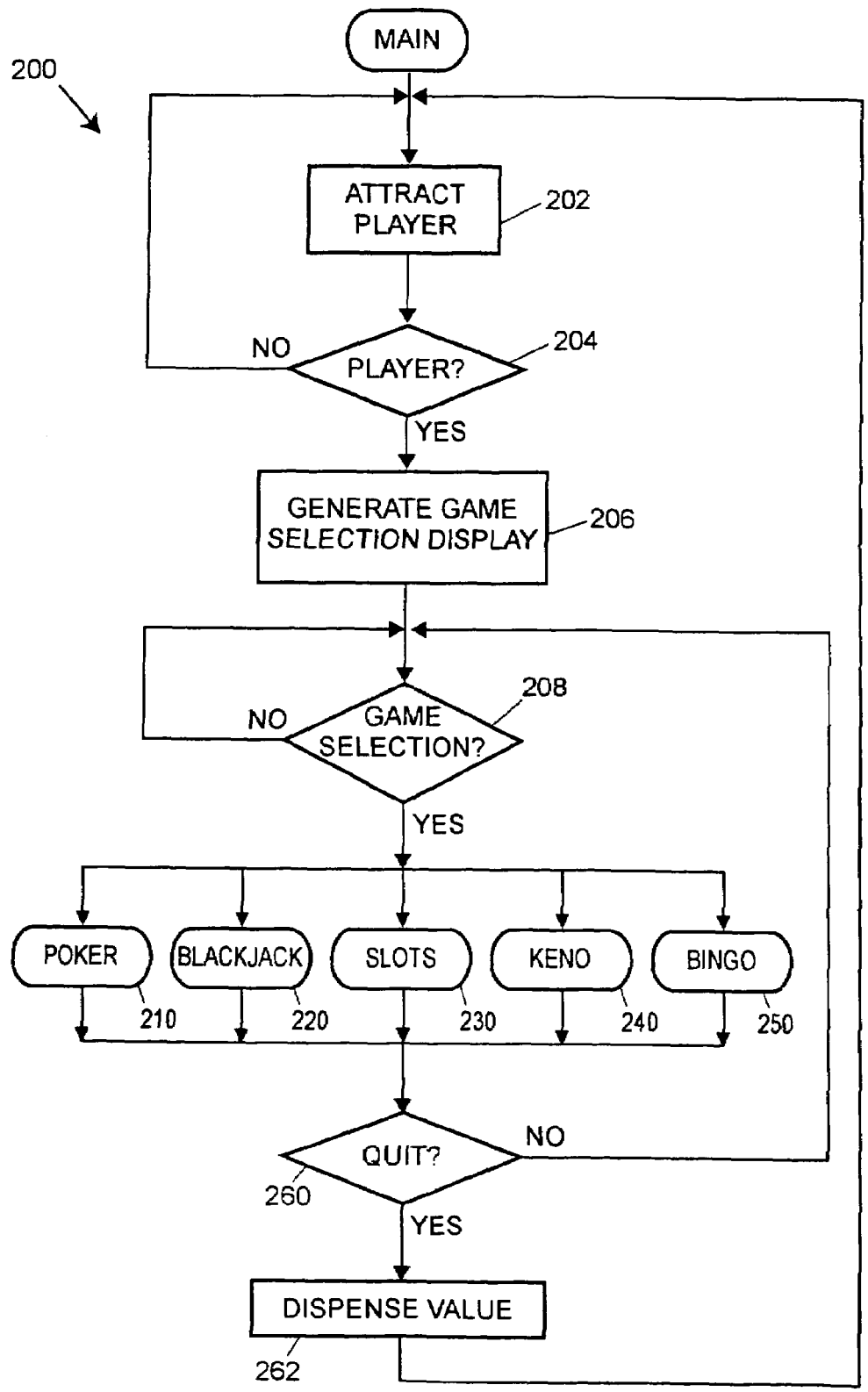
FIG. 4 is a flowchart of an embodiment of a main routine that may be performed during operation of one or more of the gaming units.

FIG. 4 is a flowchart of a main operating routine 200 that may be stored in the memory of the controller 100. Referring to FIG. 4, the main routine 200 may begin operation at block 202 during which an attraction sequence may be performed in an attempt to induce a potential player in a casino to play the gaming unit 20. The attraction sequence may be performed by displaying one or more video images on the primary display unit 84 and/or causing one or more sound segments, such as voice or music, to be generated via the speakers 62. The attraction sequence may include a scrolling list of games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 204, the attraction sequence may be terminated and a game-selection display may be generated on the primary display unit 84 at block 206 to allow the player to select a game available on the gaming unit 20. The gaming unit 20 may detect an input at block 204 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; etc.

The game-selection display generated at block 206 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 208, the controller 100 may cause one of a number of game routines to be performed to allow the selected game to be played. For example, the game routines could include a video poker routine 210, a video blackjack routine 220, a slots routine 230, a video keno routine 240, and a video bingo routine 250.

At block 208, if no game selection is made within a given period of time, the operation may branch back to block 202.

After one of the routines 210, 220, 230, 240, 250 has been performed to allow the player to play one of the games, block 260 may be utilized to determine whether the player wishes to terminate play on the gaming unit 20 or to select another game. If the player wishes to stop playing the gaming unit 20, which wish may be expressed, for example, by selecting a "Cash Out" button, the controller 100 may dispense value to the player at block 262 based on the outcome of the game(s) played by the player. The operation may then return to block 202. If the player did not wish to quit as determined at block 260, the routine may return to block 208 where the game-selection display may again be generated to allow the player to select another game.

It should be noted that although five gaming routines are shown in FIG. 4, a different number of routines could be included to allow play of a different number of games. The gaming unit 20 may also be programmed to allow play of different games.

Figure 5:
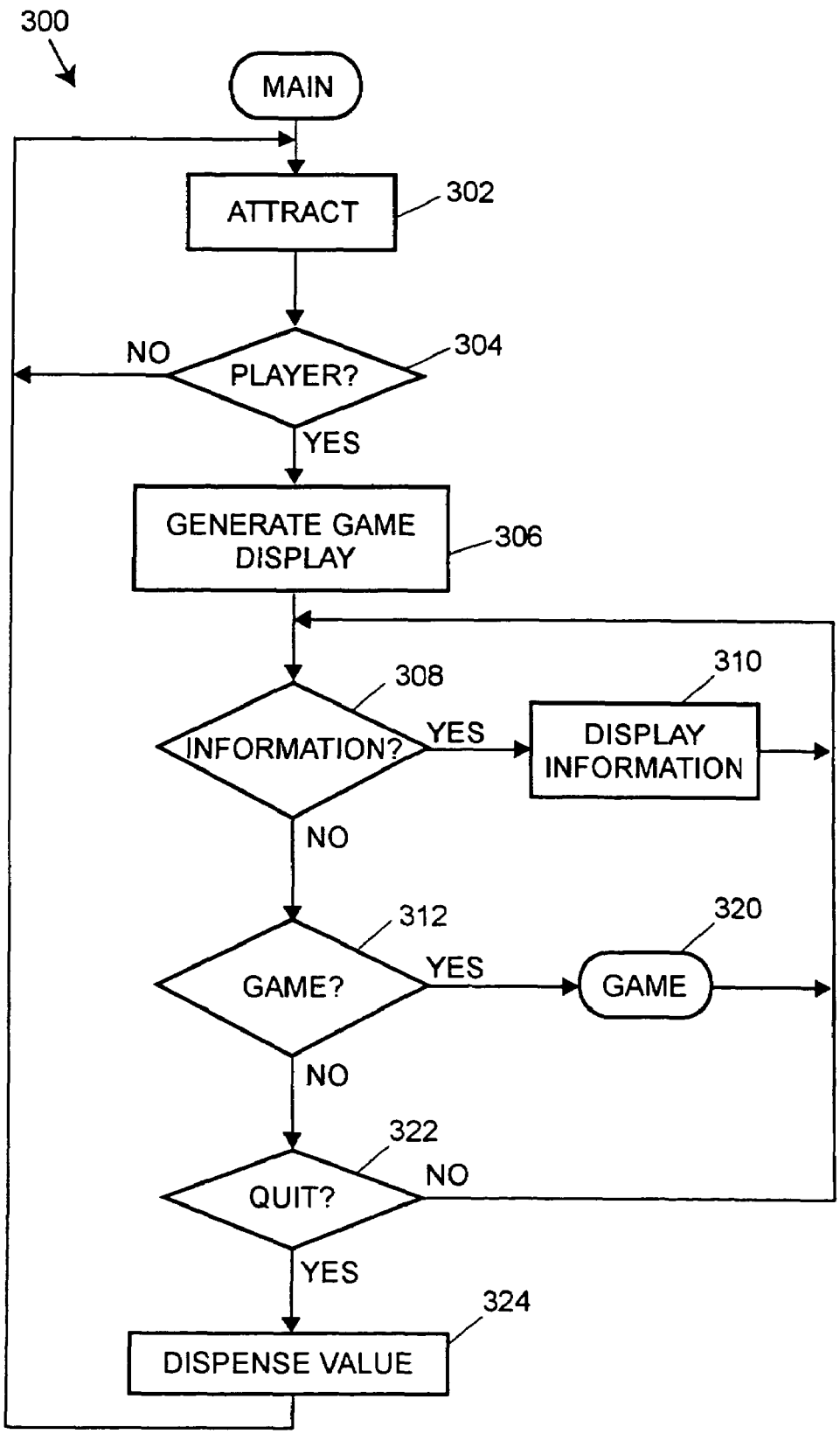
FIG. 5 is a flowchart of an alternative embodiment of a main routine that may be performed during operation of one or more of the gaming units.

FIG. 5 is a flowchart of an alternative main operating routine 300 that may be stored in the memory of the controller 100. The main routine 300 may be utilized for gaming units 20 that are designed to allow play of only a single game or single type of game. Referring to FIG. 5, the main routine 300 may begin operation at block 302 during which an attraction sequence may be performed in an attempt to induce a potential player in a casino to play the gaming unit 20. The attraction sequence may include displaying images via the primary display unit 84 and/or causing one or more sound segments, such as voice or music, to be generated via the speakers 62.

During performance of the attraction sequence, if a potential player makes any input to the gaming unit 20 as determined at block 304, the attraction sequence may be terminated and a game display may be generated on the primary display unit 84 at block 306. The game display generated at block 306 may include, for example, an image of the casino game that may be played on the gaming unit 20 and/or a visual message to prompt the player to deposit value into the gaming unit 20. In gaming machines that include a mechanical display (e.g., mechanical reels), block 306 may be omitted. At block 308, the gaming unit 20 may determine if the player requested information concerning the game, in which case the requested information may be displayed at block 310. Block 312 may be used to determine if the player requested initiation of a game, in which case a game routine 320 may be performed. The game routine 320 could be any one of the game routines disclosed herein, such as one of the five game routines 210, 220, 230, 240, 250, or another game routine.

After the routine 320 has been performed to allow the player to play the game, block 322 may be utilized to determine whether the player wishes to terminate play on the gaming unit 20. If the player wishes to stop playing the gaming unit 20, which wish may be expressed, for example, by selecting a "Cash Out" button, the controller 100 may dispense value to the player at block 324 based on the outcome of the game(s) played by the player. The operation may then return to block 302. If the player did not wish to quit as determined at block 322, the operation may return to block 308.

Video Poker

Figure 6:
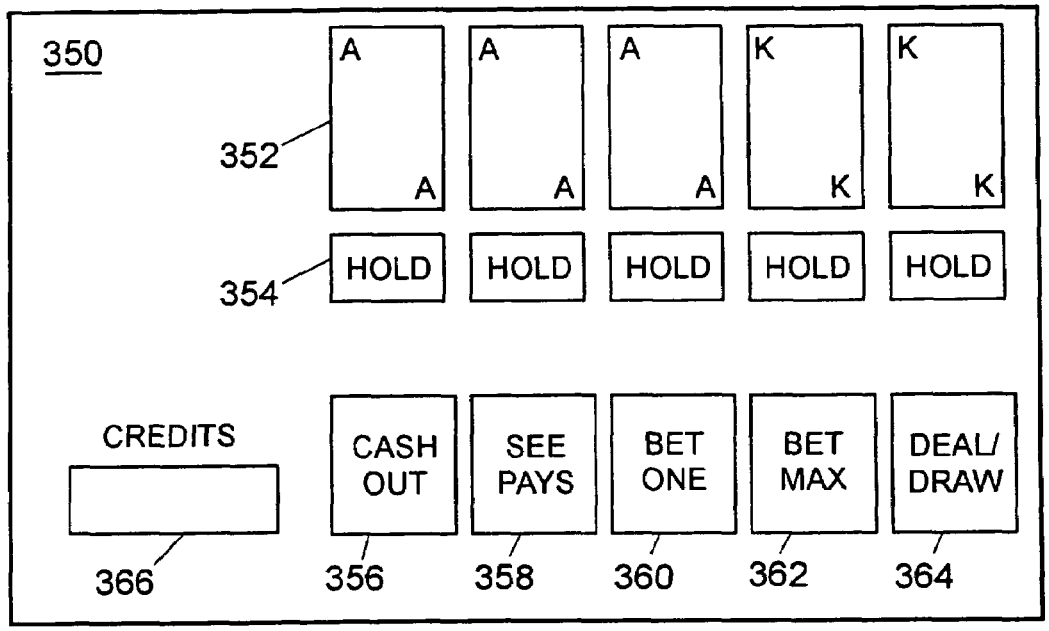
FIG. 6 is an illustration of an embodiment of a visual display that may be displayed during performance of the video poker routine of FIG. 8.

FIG. 6 is an exemplary display 350 that may be shown on the primary display unit 84 during performance of the video poker routine 210 shown schematically in FIG. 4. Referring to FIG. 6, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the display unit 70 is provided with a touch-sensitive screen, the buttons 354, 356, 358, 360, 362, 364 may form part of the video display 350. Alternatively, one or more of those buttons may be provided as part of a control panel that is provided separately from the display unit 70.

Figure 8:
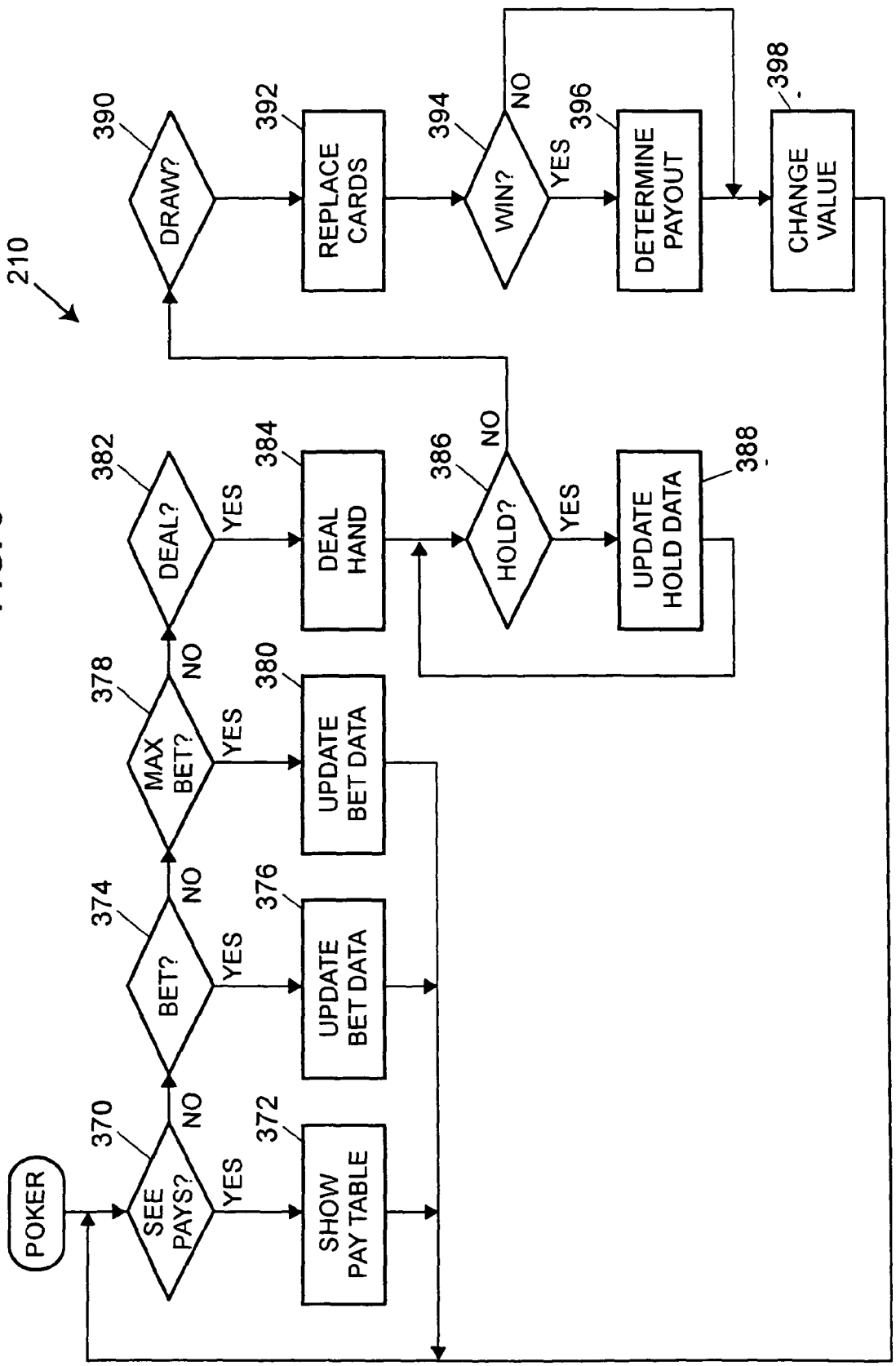
FIG. 8 is a flowchart of an embodiment of a video poker routine that may be performed by one or more of the gaming units.

FIG. 8 is a flowchart of the video poker routine 210 shown schematically in FIG. 4. Referring to FIG. 8, at block 370, the routine may determine whether the player has requested pay-out information, such as by activating the "See Pays" button 358, in which case at block 372 the routine may cause one or more pay tables to be displayed on the primary display unit 84. At block 374, the routine may determine whether the player has made a bet, such as by pressing the "Bet One Credit" button 360, in which case at block 376 bet data corresponding to the bet made by the player may be stored in the memory of the controller 100. At block 378, the routine may determine whether the player has pressed the "Bet Max Credits" button 362, in which case at block 380 bet data corresponding to the maximum allowable bet may be stored in the memory of the controller 100.

At block 382, the routine may determine if the player desires a new hand to be dealt, which may be determined by detecting if the "Deal/Draw" button 364 was activated after a wager was made. In that case, at block 384 a video poker hand may be "dealt" by causing the primary display unit 84 to generate the playing card images 352. After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 6).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Video Blackjack

Figure 7:
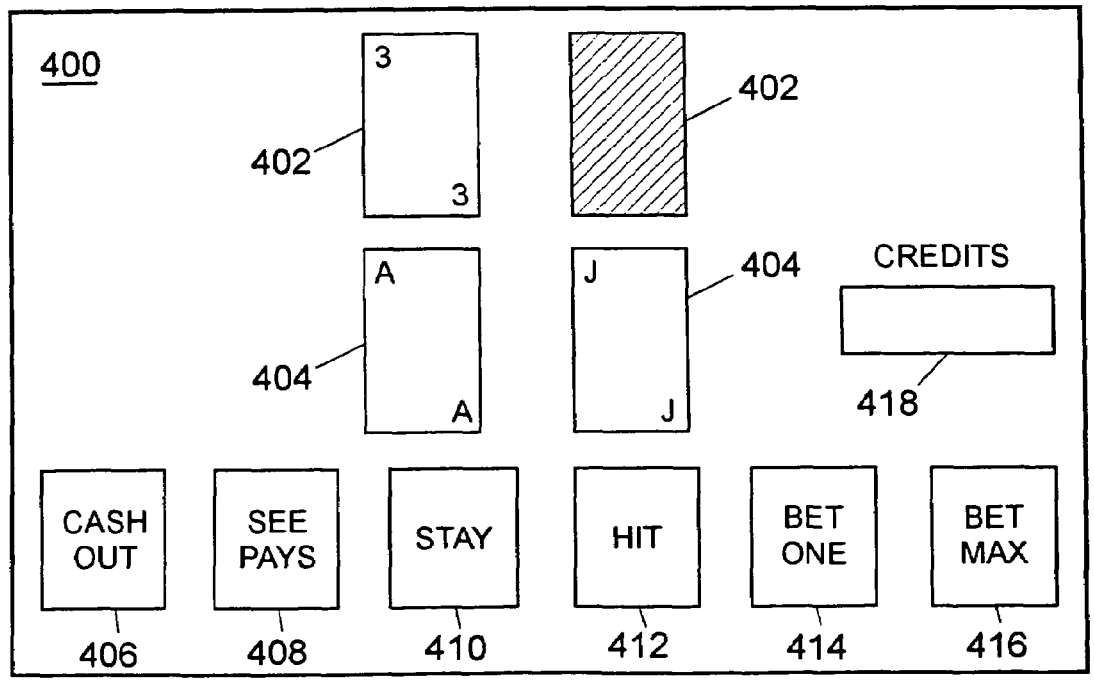
FIG. 7 is an illustration of an embodiment of a visual display that may be displayed during performance of the video blackjack routine of FIG. 9.

FIG. 7 is an exemplary display 400 that may be shown on the primary display unit 84 during performance of the video blackjack routine 220 shown schematically in FIG. 4. Referring to FIG. 7, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video black-jack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit 70 is provided with a touch-sensitive screen, the buttons 406, 408, 410, 412, 414, 416 may form part of the video display 400. Alternatively, one or more of those buttons may be provided as part of a control panel that is provided separately from the display unit 70.

Figure 9:
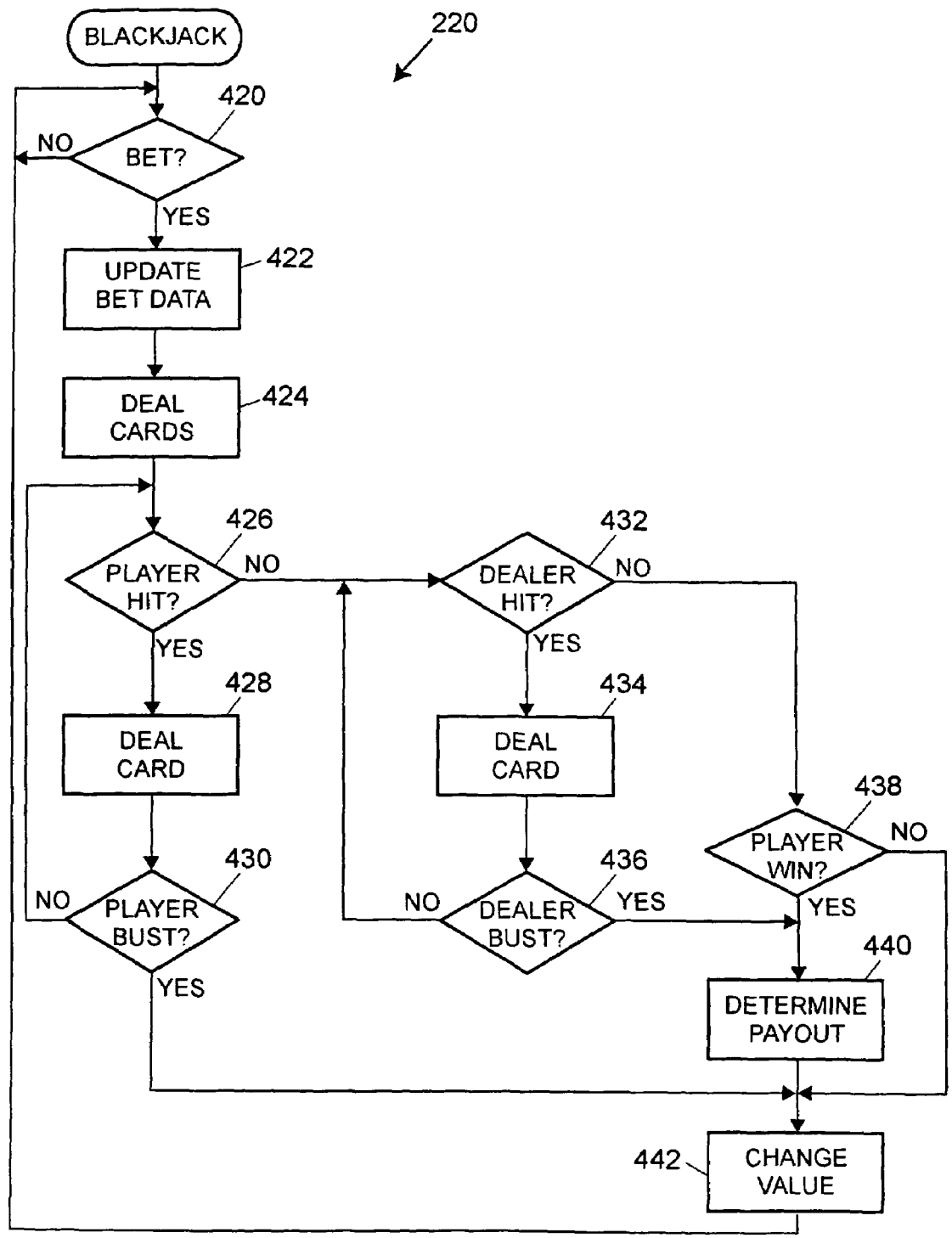
FIG. 9 is a flowchart of an embodiment of a video blackjack routine that may be performed by one or more of the gaming units.

FIG. 9 is a flowchart of the video blackjack routine 220 shown schematically in FIG. 4. Referring to FIG. 9, the video blackjack routine 220 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the primary display unit 84.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440.

The cumulative value or number of credits may also be displayed in the display area 418 (FIG. 7).

Video Slots

Figure 10:
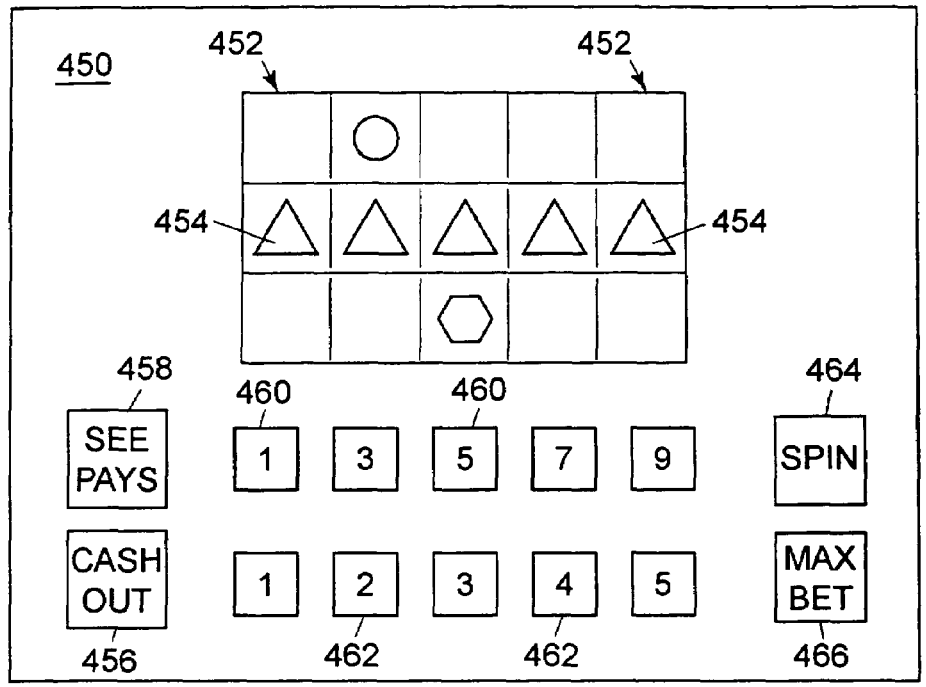
FIG. 10 is an illustration of an embodiment of a visual display that may be displayed during performance of the slots routine of FIG. 12.

FIG. 10 is an exemplary display 450 that may be shown on the primary display unit 84 during performance of the slots routine 230 shown schematically in FIG. 4. Referring to FIG. 10, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized. For example, U.S. Pat. No. 6,413,162 to Baerlocher et al. describes a gaming device having unisymbol display reels. Each symbol on a display of the gaming device represents, or is included on, a different reel. In one specific example, U.S. Pat. No. 6,413,162 describes displaying eighteen independent unisymbol reels, each capable of randomly generating and displaying one of a plurality of symbols. In another example, U.S. Pat. No. 6,413,162 describes unisymbol reels displayed in concentric circles.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 12:
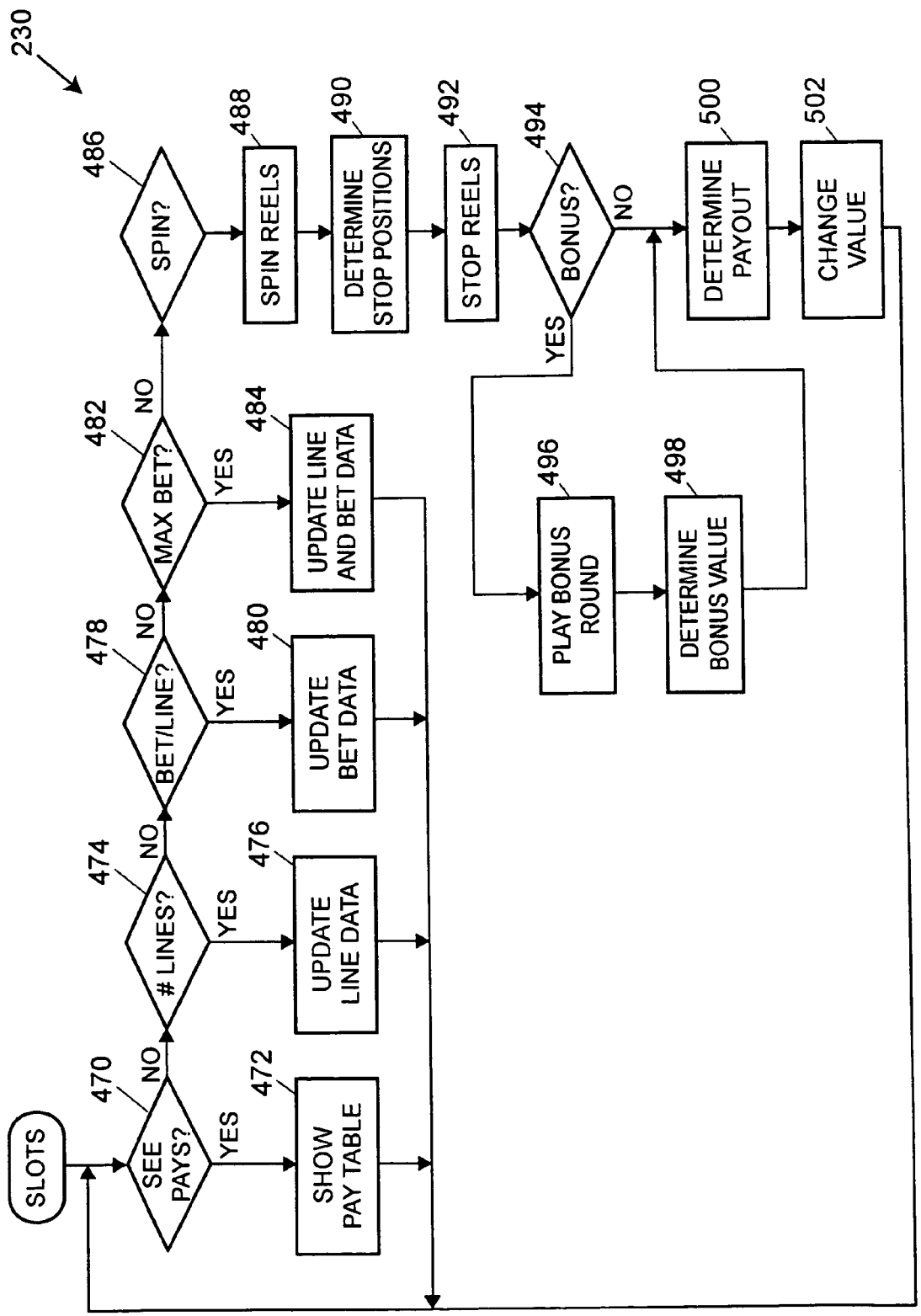
FIG. 12 is a flowchart of an embodiment of a slots routine that may be performed by one or more of the gaming units.

FIG. 12 is a flowchart of the slots routine 230 shown schematically in FIG. 10. Referring to FIG. 12, at block 470, the routine may determine whether the player has requested payout information, such as by activating the "See Pays" button 458, in which case at block 472 the routine may cause one or more pay tables to be displayed on the primary display unit 84. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet may be stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine 230 may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the primary display unit 84, actual slot machine reels that are capable of being spun may be utilized instead.

Video Keno

Figure 11:
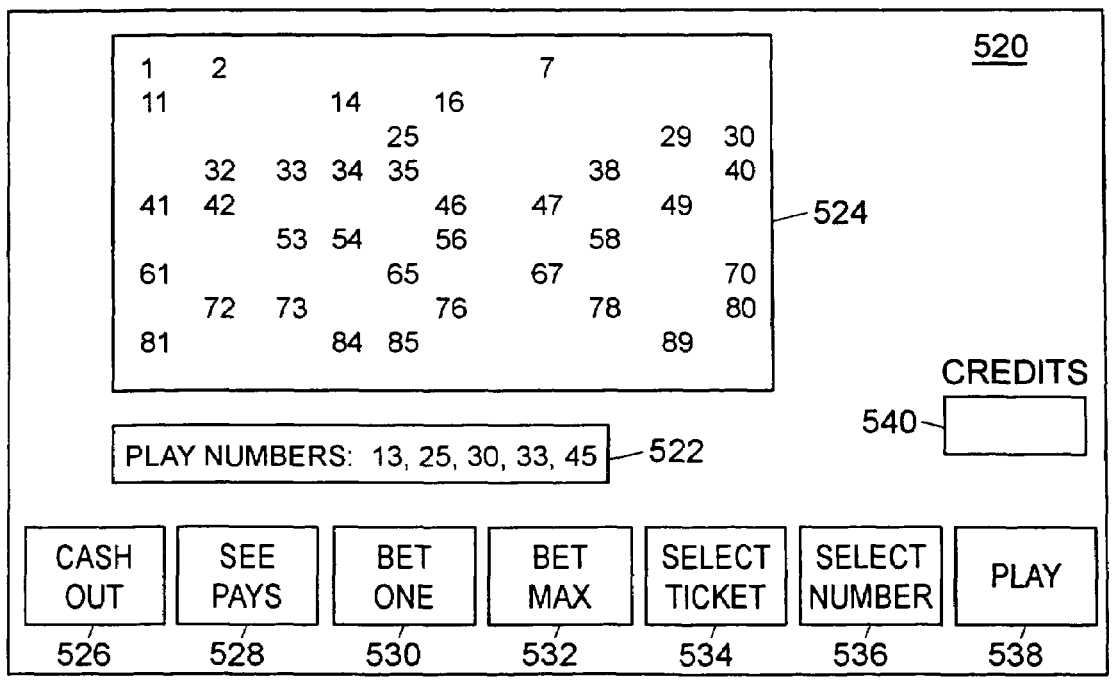
FIG. 11 is an illustration of an embodiment of a visual display that may be displayed during performance of the video keno routine of FIG. 13.

FIG. 11 is an exemplary display 520 that may be shown on the primary display unit 84 during performance of the video keno routine 240 shown schematically in FIG. 4. Referring to FIG. 11, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 13:
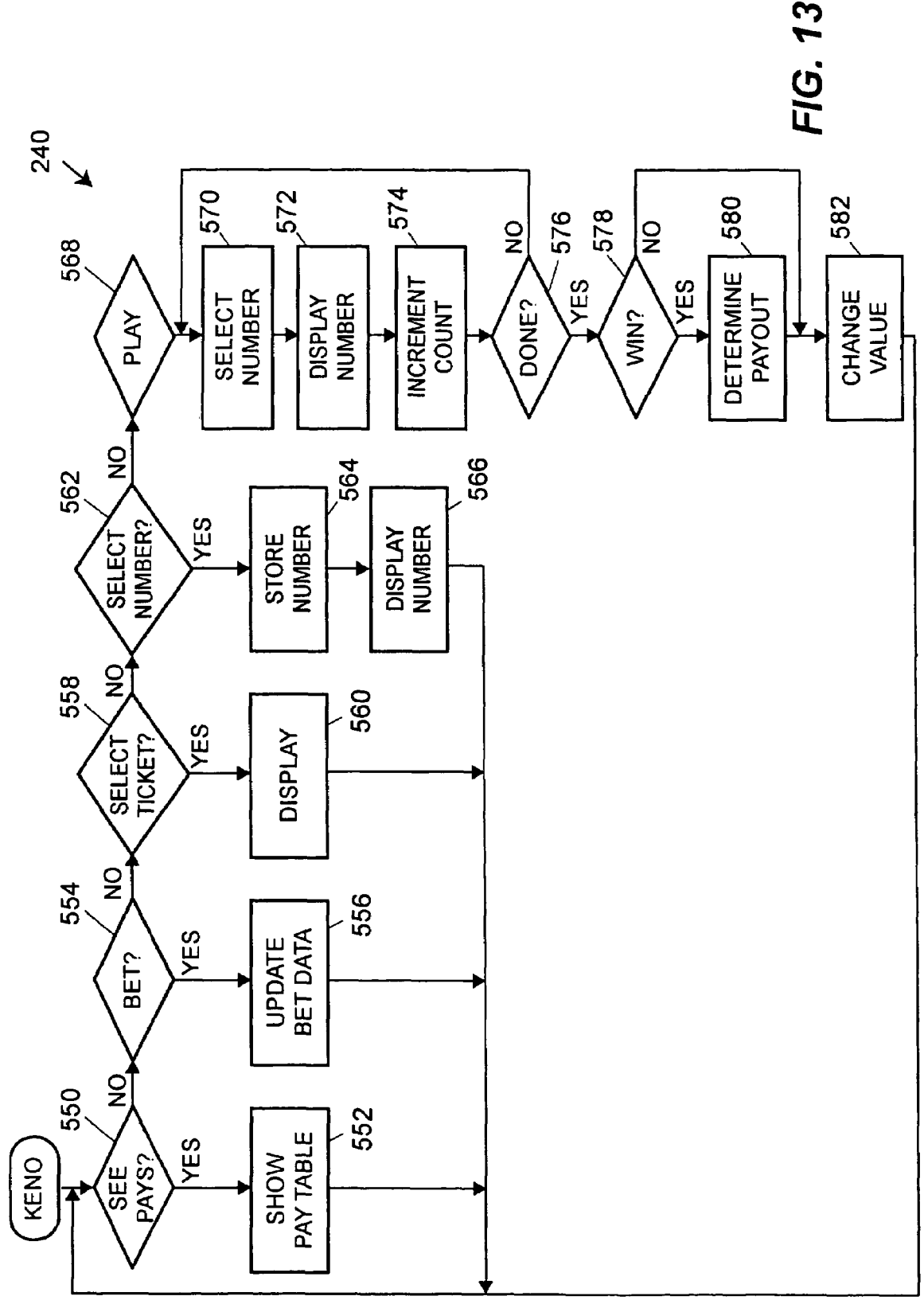
FIG. 13 is a flowchart of an embodiment of a video keno routine that may be performed by one or more of the gaming units.

FIG. 13 is a flowchart of the video keno routine 240 shown schematically in FIG. 4. The keno routine 240 may be utilized in connection with a single gaming unit 20 where a single player is playing a keno game, or the keno routine 240 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 13, at block 550, the routine may determine whether the player has requested payout information, such as by activating the "See Pays" button 528, in which case at block 552 the routine may cause one or more pay tables to be displayed on the primary display unit 84. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the primary display unit 84 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 11).

Video Bingo

Figure 14:
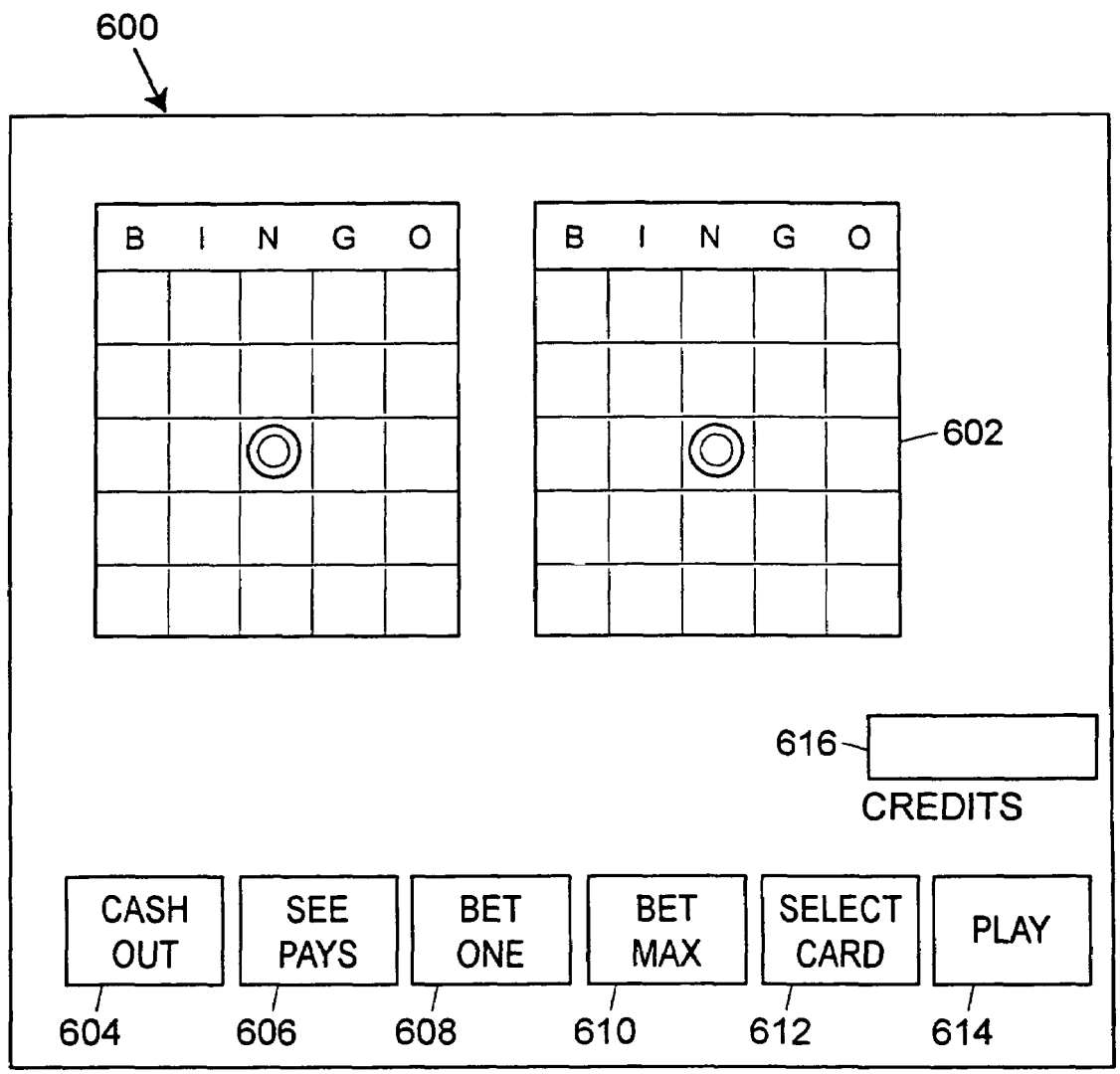
FIG. 14 is an illustration of an embodiment of a visual display that may be displayed during performance of the video bingo routine of FIG. 15.

FIG. 14 is an exemplary display 600 that may be shown on the primary display unit 84 during performance of the video bingo routine 250 shown schematically in FIG. 4. Referring to FIG. 14, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70.

Figure 15:
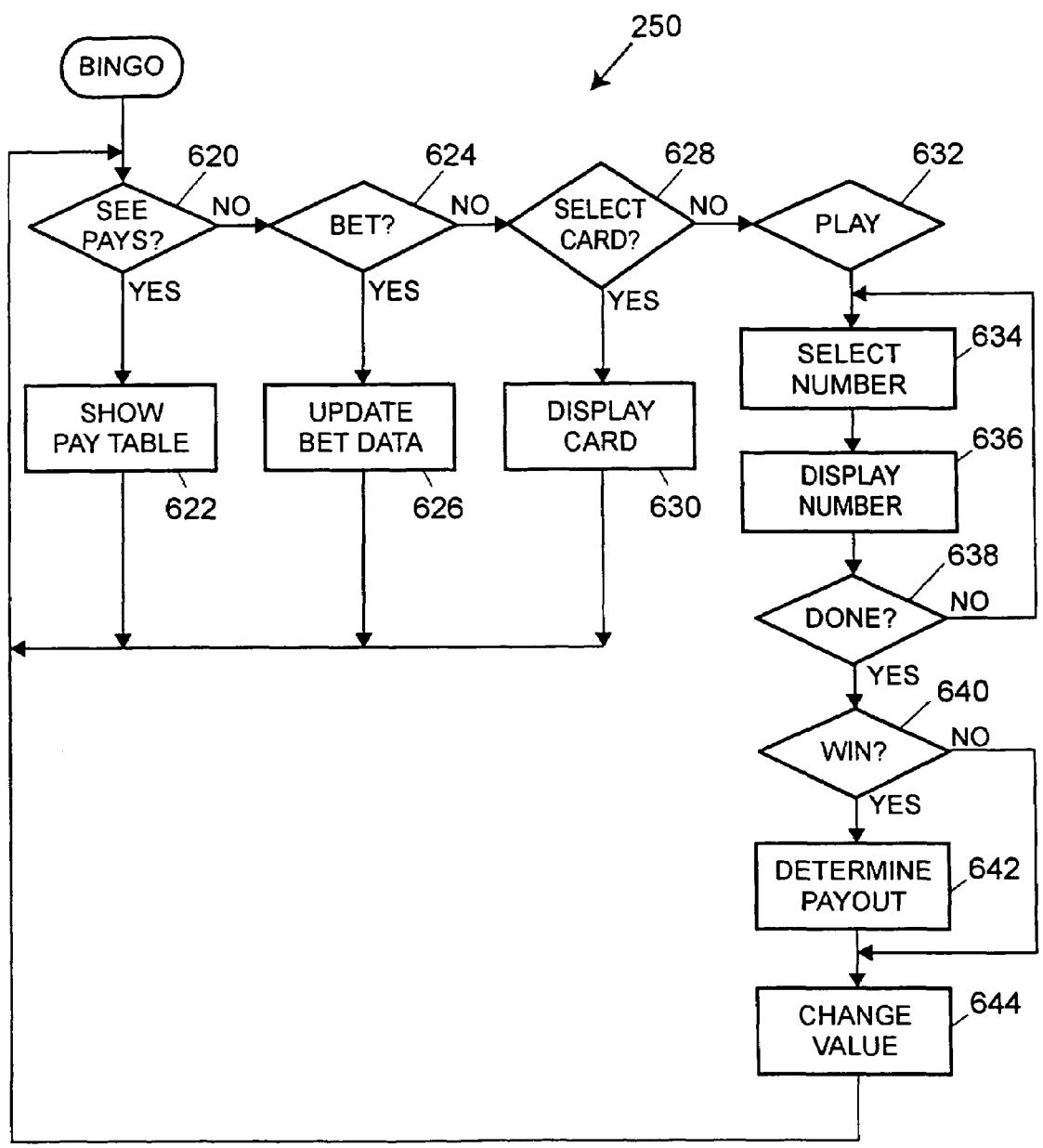
FIG. 15 is a flowchart of an embodiment of a video bingo routine that may be performed by one or more of the gaming units.

FIG. 15 is a flowchart of the video bingo routine 250 shown schematically in FIG. 4. The bingo routine 250 may be utilized in connection with a single gaming unit 20 where a single player is playing a bingo game, or the bingo routine 250 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 15, at block 620, the routine may determine whether the player has requested payout information, such as by activating the "See Pays" button 606, in which case at block 622 the routine may cause one or more pay tables to be displayed on the primary display unit 84. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the primary display unit 84 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 14).

Overview of Gaming Unit Software Employing a Script File

Figure 16:
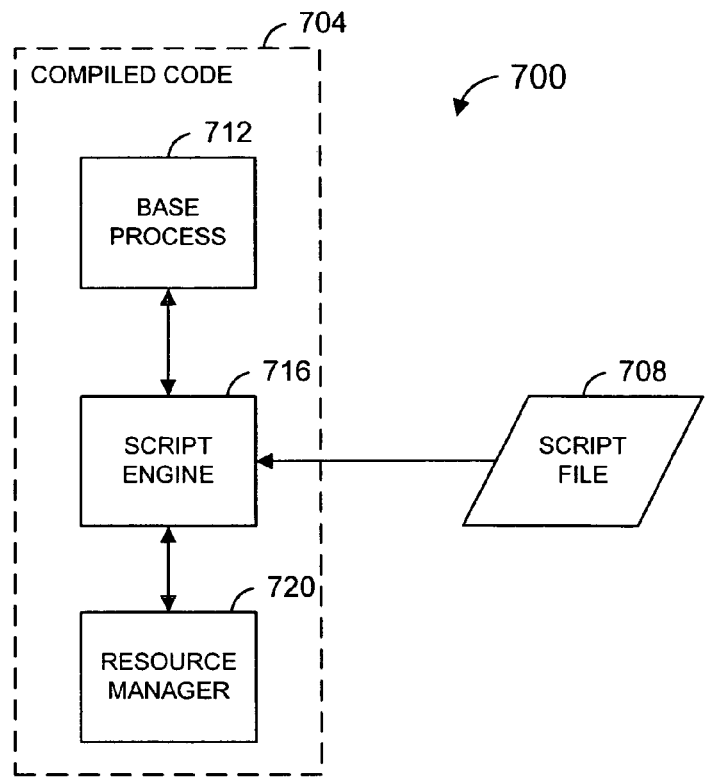
FIG. 16 is a block diagram of information flow between various components of software processes in one embodiment of a gaming unit.

FIG. 16 is a block diagram of information flow between various components of software 700 in one embodiment of a gaming unit. The software 700 of the gaming unit may include compiled software code 704 that accesses a script file 708. The compiled software code 704 may include software that was written in a high level programming language (e.g., C, C++, Pascal, Object Pascal, Smalltalk, Java, etc.) and that was then compiled and/or linked into a machine-executable format. Referring to FIG. 3, the software 700 may be stored in the program memory or memories 102 of the controller 100. Alternatively, some or all of the software 700 could be stored in the RAM(s) 106. For example, the compiled software code 704 could be stored in the program memory 102, and the script file 708 could be stored in the RAM 106.

The script file 708 may include uncompiled software instructions in a scripting language, which may be a high-level programming language. The uncompiled software instructions of the script file 708 generally include data indicative of requests to be made of the uncompiled software code 704. For example, if an object-oriented programming approach is employed, the uncompiled software instructions of the script file 708 may include a request to create an instance of an object and/or a request to invoke a member function of an already created object. The uncompiled software instructions may include instruction data that has not been compiled and/or linked into a machine-executable format.

The compiled software code 704 may include a base process 712, a script engine 716, and a resource manager 720. Although only one base process 712 is shown, the compiled software code 704 may include a plurality of base processes.

For example, a plurality of base processes 712 may correspond to different functionality of the gaming unit 20. The base process 712 includes compiled software instructions associated with game play of the gaming unit 20. For example, the base process 712 may include compiled software instructions related to one or more of player attraction, game selection, determining payouts, dispensing payouts, generating video, generating audio, etc. The script engine 716 is a process that generally may examine the script file 708 and may pass along data in the script file 708 indicative of requests to the compiled software code 704. For example, if an object-oriented programming approach is employed, the script engine 716 may pass along a data indicating a request to a current object. Also, the script engine 716 may pass along data indicative of a request to the resource manager 720. Operation of the script engine 716 will be described in more detail below.

The resource manager 720 is a process that, if an object-oriented programming approach is employed, generally may create instances of objects. For example, the resource manager 720 may be capable of creating instances of various different classes of objects. In one embodiment, the resource manager 720 may be able to respond to requests that a base process cannot.

Figure 17:
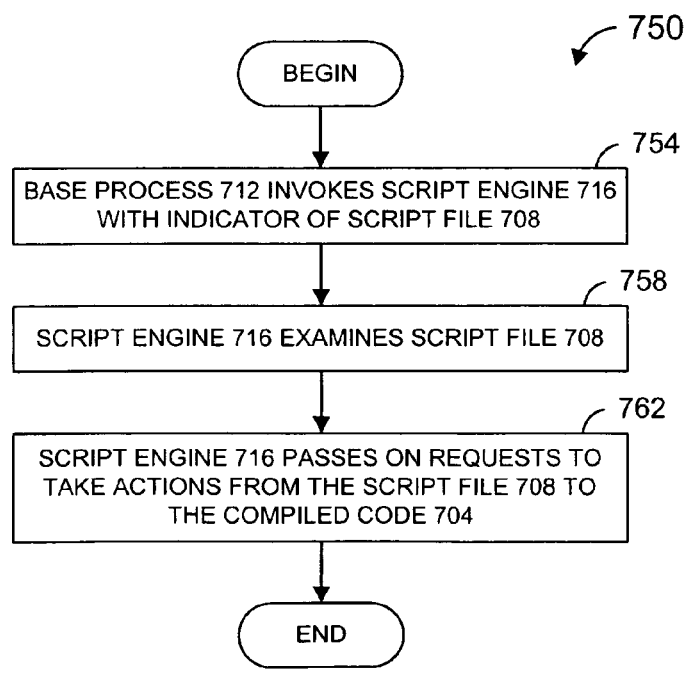
FIG. 17 is a flowchart of an embodiment of a routine that may be performed by a gaming unit.

FIG. 17 is a flow diagram illustrating one embodiment of a method by which the software 700 of FIG. 16 may operate. At block 754 of the method 750, the base process 712 may invoke the script engine 716 with an indication of a particular script file 708. For example, the base process 712 may invoke the script engine 716 with a pointer to the script file 708.

At block 758, the script engine 716 may examine the script file 708. In general, the script engine 716 may examine the script file 708 for requests that should be passed on to the compiled code 704. Examples of script engine examination of the script file 708 will be described below.

When the script engine 716 identifies a request in the script file 708, at block 762 the script engine 716 passes on the request to the compiled code 704. For example, if an object-oriented programming approach is employed, the script engine 716 may pass on to the resource manager 720 a request to create an instance of an object. As another example, the script engine 716 may pass on to a current object a request to invoke a member function of the object.

Scripting Language

One example of a scripting language will now be described. It is to be understood that this scripting language is merely one example of a scripting language that may be employed, and that other languages may be used as well. For instance, although the syntax of the scripting language to be described is similar in some respects to the syntax of the C++ programming language, languages similar to other types of languages could be used including Objective-C, Object Pascal, Smalltalk, Java, etc. Additionally, the scripting language need not be similar to object-oriented programming language, but could be similar to other types of languages including C, Pascal, etc.

Table 1 provides a list of commands, syntax, keywords, etc., according to one example of a scripting language. In one embodiment, a script file may be written and/or stored in a textual format (e.g., ASCII).

TABLE 1

| TYPE | SYNTAX | EXPLANATION |
| --- | --- | --- |
| Header | AVP_ASCII_FORMAT VERSION = VersionNumber | This is to be the first entry in the script file. The version number should be a four digit number (e.g., 0005). The version numbers are to start with 0001. |
| Object Creation | ObjectType("Object name")<br>{<br>  invoke function;<br>  create another object;<br>} | "ObjectType" should be an object type known to the underlying code. "(" and ")" indicate a name of the object to be created. If nothing is included between the "(" and ")", the object will not be named. Data within brackets can include instructions for invoking functions and creating other objects. |
| Invoke Function of Current Object | {<br>  FunctionName(data);<br>} | "(" and ")" indicate parameters to be passed to function. Parameters are separated by commas. Request to invoke function within brackets "{" and "}" of object indicates request should be made to current object |

TABLE 1-continued

| TYPE | SYNTAX | EXPLANATION |
| --- | --- | --- |
| C-style Comment | /* This is a C-style multiple lines remark */ | C-style comments are supported. |
| C++-style Comment | // This is a C++ one line remark | C++-style comments are supported |
| Array | [1.0f, 2.0f, 1.0f] | "[" and "]" indicate an array. Elements of the array are separated by comments. Arrays can contain various data types |
| Primitive double | 1.0d | "d" indicates a double type |
| Primitive float | 1.0f | "f" indicates a float type |
| Primitive signed byte | 1b | "b" indicates a signed byte |
| Primitive unsigned byte | 1ub | "ub" indicates an unsigned byte |
| Primitive signed word | 1w | "w" indicates a signed word |
| Primitive unsigned word | 1uw | "uw" indicates an unsigned word |
| Primitive signed 32-bit integer | 1L | "L" indicates a signed 32-bit integer |
| Primitive unsigned 32-bit integer | 1uL | "uL" indicates an unsigned 32-bit integer |
| Primitive signed 64-bit integer | 1LL | "LL" indicates a signed 64-bit integer |
| Primitive unsigned 64-bit integer | 1uLL | "uLL" indicates an unsigned 64-bit integer |
| Primitive boolean | true false | Reserved words "true" and "false" indicate Boolean values |
| Primitive string | "This is a string" | Strings are enclosed by double quotes |
| Primitive this | FunctionName(this) | "this" is a reserved word indicating the current object's C++ "this" pointer as a parameter |

One example of software instructions written in the above-described scripting language is presented below:

```
AVP_ASCII_FORMAT VERSION = 0001 // Version number 0001
GLScene( )      // Create unnamed object of type GLScene. This object
{               // becomes the current object.
    init( );    // invoke function "init" on newly created GLScene-type
                // object, no parameters passed.
    Lighting(ENABLE)   // invoke function Lighting which creates an
    {                  // object called "Lighting." The object type
                       // GLScene should know how to do this and it
                       is
                       // responsible for doing so.
        // Functions to be invoked on the Lighting object
        AmbientColor(0.3, 0.3, 0.3);
        DiffuseColor(0.2, 0.2, 0.2);
        SpecularColor(0.1, 0.1, 0.1);
        EmitionColor(0.0, 0.0, 0.0);
    }           // End of object Lighting. Current object becomes the
                // GLScene-type object
}   // End of the GLScene-type object.
```

In this example, an object of type GLScene is to be created. In operation, the script engine 716 should pass a request to the compiled code 704 to create an object of type GLScene. The script engine 716 need not have any knowledge of permissible object types or how such an object is to be created. Rather, the compiled code 704 is to be responsible for servicing the request. Once the GLScene-type object is created, it becomes the current object.

Next, the function "init" is to be invoked. In operation, the script engine 716 should pass a request to the current object (which is the newly created object of type GLScene) to invoke its function "init." The GLScene-type object is responsible for servicing this request. Then, a new object called "Lighting" is to be created. In operation, the script engine 716 should pass a request to the newly created object of type GLScene to invoke a function "Lighting." The GLScene-type object is responsible for servicing this request. The GLScene-type object should create the new object, which then becomes the current object.

Next, several member functions of the "Lighting" object are to be invoked. In operation, the script engine 716 should pass requests to the current object (which is the "Lighting" object) to invoke these functions. The Lighting object is responsible for servicing these requests. Then, brackets "}" indicate the ends of the "Lighting" and GLScene-type objects.

In one embodiment, the scripting language can be written in, converted to, and/or stored in, a binary form. Table 2 provides a list of binary command tags, syntax, etc. for a binary form language that correspond to the above-described example of a scripting language. Each tag in the binary format described below should include at least two fields: a Tag ID field (4-bytes in length), and a Tag Length field (4-bytes in length). Additionally, a tag may have additional optional fields specific to the particular tag. Examples of various Tag ID's are described below. The Tag Length field indicates the length of the tag beyond the first two fields. For example, if the tag does not include any optional fields, the Tag Length would be 0. Tags can be included within other tags. Additionally, the script engine 716 may be configured to ignore and skip over tags it does not recognize.

TABLE 2

| TYPE | Tag ID | EXPLANATION |
|---|---|---|
| Header | HDR_ | This tag is to include two additional fields: a 4-byte format identifier (e.g., "AVPF") and a 4-byte format version number. Version number starts with 0001. Every file is to include one header. If the length of this tag includes the length of all other tags included within a script file, then this field may be used to detect whether the script file has been truncated. |
| Object Creation | OBJ_ | This tag is to include an object type string tag and an optional object name string tag. The object type may be used by the resource manager 720 to construct this object. |
| Invoke Function of Current Object | FUNC | This tag is to include a function name string tag and any number of primitive data type tags. Functions are to be invoked by the current object. |
| C-style Comment | REM_ | This tag may be used, for example, to keep any C-style comments generated in a text version of the script file. The tag is to include the string that makes up the remark. Strings are to end with "\0". |
| C++-style Comment | REM+ | This tag may be used, for example, to keep any C++-style comments generated in a text version of the script file. The tag is to include field indicating a field (4-byte) indicating the length of the comment, and the string that makes up the remark. Strings are to end with "\0". |
| Primitive double | DBL_ | This tag is to include one or more double-type numbers. Thus, in effect, arrays can be specified. |
| Primitive float | FLT_ | This tag is to include one or more floating point-type numbers. Thus, in effect, arrays can be specified. |
| Primitive signed byte | I8_ | This tag is to include one or more signed 8-bit integers. Thus, in effect, arrays can be specified. |
| Primitive unsigned byte | UI8_ | This tag is to include one or more unsigned 8-bit integers. Thus, in effect, arrays can be specified. |
| Primitive signed word | I16_ | This tag is to include one or more signed 16-bit integers. Thus, in effect, arrays can be specified. |
| Primitive unsigned word | UI16 | This tag is to include one or more unsigned 16-bit integers. Thus, in effect, arrays can be specified. |
| Primitive signed 32-bit integer | I32_ | This tag is to include one or more signed 32-bit integers. Thus, in effect, arrays can be specified. |
| Primitive unsigned 32-bit integer | UI32 | This tag is to include one or more unsigned 16-bit integers. Thus, in effect, arrays can be specified. |
| Primitive signed 64-bit integer | I64_ | This tag is to include one or more signed 64-bit integers. Thus, in effect, arrays can be specified. |
| Primitive unsigned 64-bit integer | UI64_ | This tag is to include one or more unsigned 64-bit integers. Thus, in effect, arrays can be specified. |

TABLE 2-continued

| TYPE | Tag ID | EXPLANATION |
|---|---|---|
| Primitive boolean | BOOL | This tag is to include one or more 1-byte Boolean values. Thus, in effect, arrays can be specified. Reserved words "true" and "false" indicate Boolean values |
| Primitive string | STRG | This tag is to include an ASCII string ending with a "\0". |
| Primitive this | THIS | This tag is an indicator of the current object's C++ "this" pointer. The tag length is 0. |

Script Engine

Figure 18:
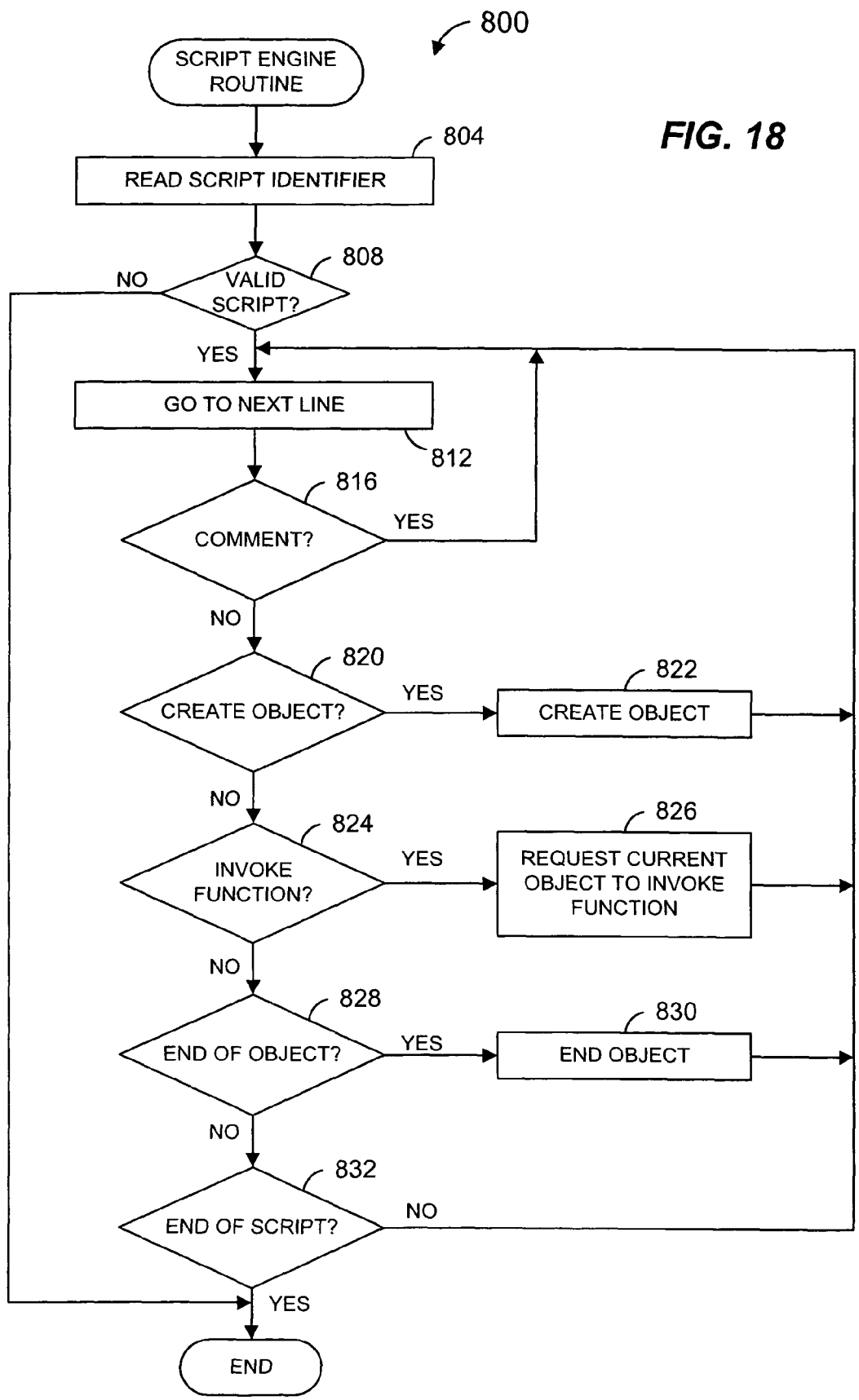
FIG. 18 is a flowchart of an embodiment of a routine for processing a script file that may be performed by a gaming unit.

FIG. 18 is flow diagram illustrating an example script engine routine. The routine 800 may be started, for example, by the controller 100 illustrated in FIG. 3. The routine 800 may be implemented, for example, when a base process invokes the script engine 716 and provides an indicator of the script file 708 to the script engine 716. The routine 800 will be described with reference to FIGS. 16 and 18.

At block 804, an identifier of the script is read from the script file 708. For example, a format identifier and/or a version number can be read from the first line of the script file 708 or the $HDR_{13}$ tag. At block 808, it may be determined whether the information read at block 804 indicates a valid script file. For example, it may be determined whether the first data in the script file 708 corresponds to an expected header. Additionally or alternatively, the format identifier can be compared to known format identifiers and/or the version number can be compared to known version numbers. If it is determined at block 808 that the script file 708 is not valid, then the routine may end.

If it is determined that the script file 708 is valid, then at block 812 the routine may go to the next line, or to the next tag, in the script file 708. At block 816, it may be determined if the line, or tag, in the script file corresponds to a comment. If the line or tag is a comment, the routine may go to block 812. If the line or tag is not a comment, then at block 820 it may be determined if the line or tag is indicative of a request to create an object. For example, if a tag is an "OBJ_" tag, then the tag indicates a request to create an object. If the line or tag is indicative of a request to create an object, then the request is passed on to the compiled code 704 at block 822, which will described in more detail below.

If the line or tag is not indicative of a request to create an object, then at block 824 it may be determined if the line or tag is indicative of a request to invoke a function. For example, if the tag is an "FUNC" tag, then the tag indicates a request to invoke a function. If the line or tag is indicative of a request to invoke a function, then the request is passed on to the compiled code 704 at block 826, which will described in more detail below.

If the line or tag is not indicative of a request to invoke a function, then at block 828 it may be determined if the line or tag is indicative of an end of an object. For example, if the length indicated by a previous "OBJ_" tag is reached, or a "}" is encountered, then an end of an object has occurred. If the line or tag is indicative of a end of an object, then a procedure for ending the object may be invoked at block 828, which will described in more detail below.

At block 832, it may be determined if an end of the script file 708 has occurred. If the end has occurred, then the routine 800 may end. Otherwise, the routine may go to block 812.

Figure 19:
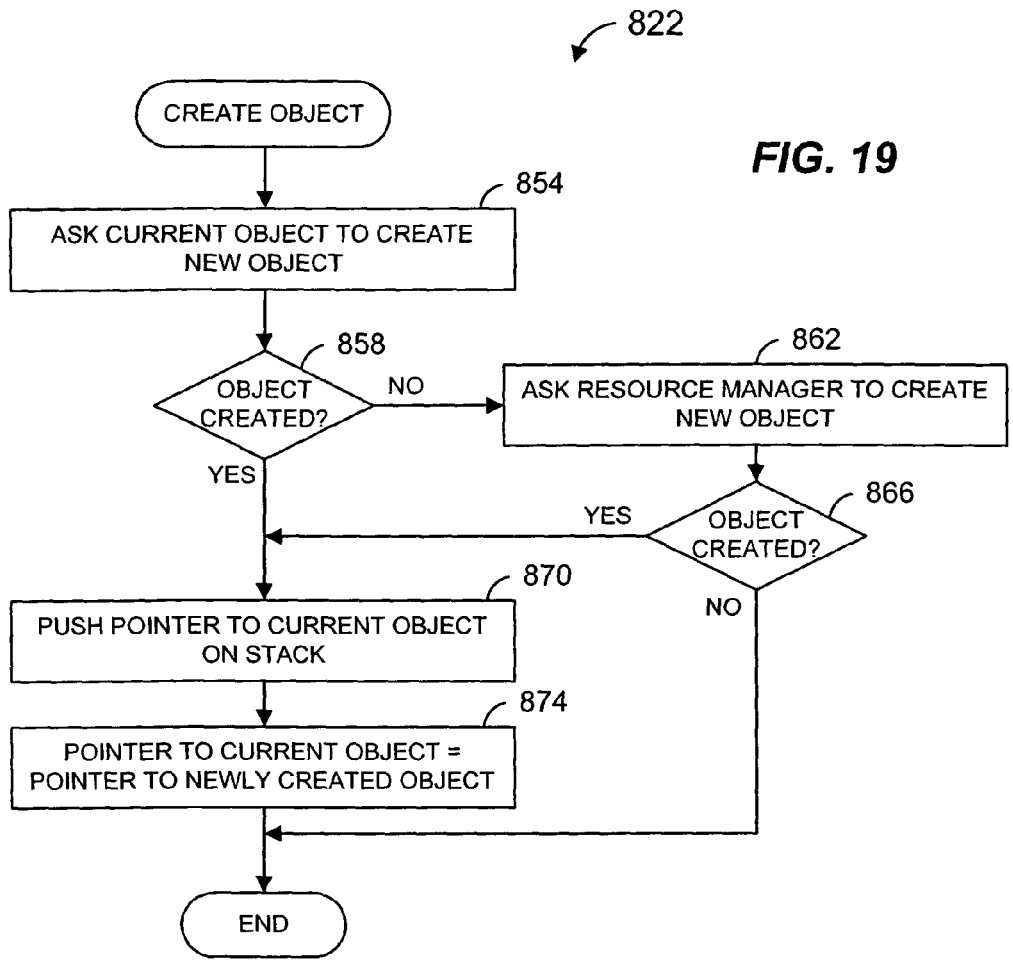
FIG. 19 is a flowchart of an embodiment of a routine for creating a software object.

FIG. 19 is flow diagram illustrating an example script engine routine 822 for creating an object. The routine 822 may be implemented, for example, by the controller 100 illustrated in FIG. 3, and will be described with reference to FIG. 16.

At block 854, the script engine 716 may request a current object to create the new object. The current object may be indicated by, for example, a "this" parameter, a pointer, a value stored on a stack, etc. At block 858, it may be determined whether the object was created. For example, the object to which the request was provided may return a value that indicates whether it created the object. If the object was not created, then at block 862, the script engine 716 may request the resource manager 720 to create the object. At block 866, it may be determined whether the object was created. For example, the resource manager 720 may return a value that indicates whether it created the object. If the object was not created, then the routine 822 may end.

If it is determined that the object was created at either of blocks 858 or 866, the routine may proceed to block 870. At block 870, a current object indicator (e.g., a pointer) may be pushed onto a stack. This stack may be used to store indicators of objects. Then, at block 874, the current object indicator may be set to an indicator (e.g., a pointer) of the newly created object.

Figure 20:
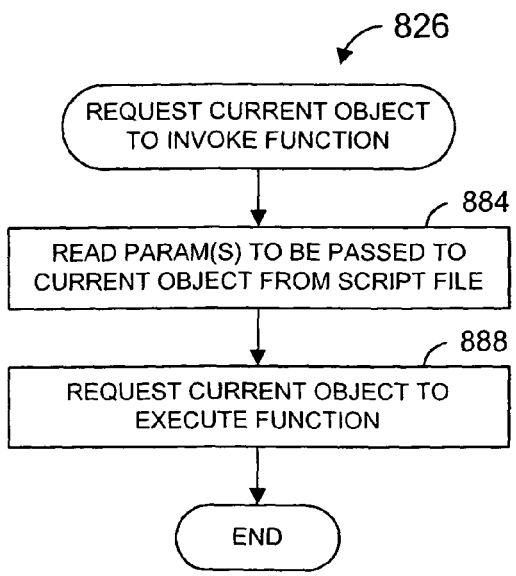
FIG. 20 is a flowchart of an embodiment of a routine for invoking a function of a software object.

FIG. 20 is flow diagram illustrating an example script engine routine 826 for requesting a current object to invoke a function. The routine 826 may be implemented, for example, by the controller 100 illustrated in FIG. 3, and will be described with reference to FIG. 16.

At block 884, the script engine 716 may read parameters to be passed to the current object for the function. For example, the parameters included in the FUNC tag or between parentheses may be read from the script file 708. At block 888, the script engine 716 may request the current object to invoke the function. As described above, the current object may be indicated by, for example, a "this" parameter, a pointer, a value stored on a stack, etc. Requesting the current object to invoke the function may include passing to the current function the corresponding function name and parameters indicated by the script file 708.

Figure 21:
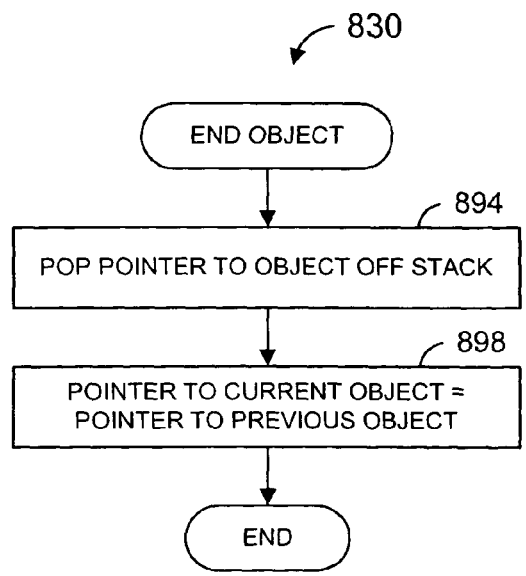
FIG. 21 is a flowchart of an embodiment of a routine for ending a software object.

FIG. 21 is flow diagram illustrating an example script engine routine 830 for ending an object. The routine 830 may be implemented, for example, by the controller 100 illustrated in FIG. 3. At block 894, the script engine 716 may pop an indicator (e.g., pointer) off the stack described above with reference to FIG. 19. The indicator popped off the stack is an indicator of the previous object. Then, at block 898 the current object indicator is set to the indicator popped off the stack.

Enhanced Scripting Language

One example of an enhanced scripting language will now be described. It is to be understood that this scripting language is merely one example of a scripting language that may be employed, and that other languages may be used as well. For instance, although the scripting language to be described is roughly similar to the C++ programming language, languages similar to other types of languages could be used including Objective-C, Object Pascal, Smalltalk, Java, etc. Additionally, the scripting language need not be similar to object-oriented programming language, but could be similar to other types of languages including C, Pascal, etc.

Table 3 provides a list of commands, syntax, keywords, etc. that may be used in addition to those of Table 1 according to one example of a scripting language. In particular, the enhanced scripting language permits a previously created object to be referenced in the script file. For example, a function of a previously created object that is not the current object may be invoked. As another example, an indicator of a previously created object may be passed as a parameter. Additionally, the enhanced scripting language permits the creation and referencing of structures in the script file. In one embodiment, a script file may be written and/or stored in a textual format (e.g., ASCII).

TABLE 3

| TYPE | SYNTAX | EXPLANATION |
| --- | --- | --- |
| Invoke Function of Referenced Object | "Object name"-> FunctionName(data) | Request to invoke function preceded by "->" indicates request should be made to named object |
| Create Structure | ("StructureName") {   data, data, data } | Similar to Object creation, but with no ObjectType indication. Structure may include arrays and other structures. |
| Reference Object or Structure | &"StructureName" &"ObjectName" | '&' is a reserved character to indicate that the text in quotes following is a structure or object name |

One example of software instructions written in the above-described scripting language is presented below:

```
AVP_ASCII_FORMAT VERSION = 0002  // Version number 0002
Actor("Parent")          // Create object of type "Actor" named "Parent"
{                        // "Parent" is now the current object
    Actor("Child")       // Create object of type "Actor" named "Child"
    {                    // "Child" is now the current object
        "Parent"->addActor (this);   // Invoke the function
    }                                // "addActor" of the object
}                                    // "Parent"
```

In this example, two objects of type Actor are to be created. In operation, the script engine 716 should pass a request to the compiled code 704 to create an object named "Parent" and of type "Actor". Once the "Parent" object is created, it becomes the current object. Next, the script engine 716 should pass a request to the "Parent" object to create an object named "Child" and of type "Actor". Once the "Child" object is created, it becomes the current object.

Next, the function "addActor" of the object "Parent" is to be invoked. In operation, the script engine 716 should pass a request to the "Parent" object, and not the current object ("Child"), to invoke its function "addActor." The "Parent" object is responsible for servicing this request.

Another example of software instructions written in the above-described scripting language is presented below:

```
Actor ("FirstActor")
{
    addVerts ([1.0f, 1.0f], [3b, 4b], true);
}
Actor ("SecondActor")
{
    // Invoke function "addActor" with reference to the
    // previously created object "FirstActor"
    addActor(&"FirstActor");
    // Create object PivotAttribute ("Pivot1")
    PivotAttribute ("Pivot1")
    {
```

-continued

```
   // Invoke function of "SecondActor"
   "SecondActor"->addPivot (this);
   }
}
```

In this example, an object named "FirstActor" and of type "Actor" is to be created. In operation, the script engine 716 should pass a request to the compiled code 704 to create an object named "FirstActor" and of type "Actor". After the "FirstActor" object is created, it becomes the current object. Then, the function "addVerts" of the object "FirstActor" is invoked, and the "}" indicates that "First Actor" is no longer the current object.

Next, an object named "SecondActor" and of type "Actor" is to be created. In operation, the script engine 716 should pass a request to the compiled code 704 to create an object named "SecondActor" and of type "Actor". After the "SecondActor" object is created, it becomes the current object.

Next, the function "addActor" of the object "SecondActor" is to be invoked. Additionally, a parameter of the function is an indicator of the previously created object "FirstActor". In operation, the script engine 716 should pass a request to the "SecondActor" object to invoke its function "addActor." Parameters for the function are to include an indicator (e.g., pointer) of the "FirstActor" object.

Then, an object named "Pivot1" and of type "PivotAttribute" is to be created. In operation, the script engine 716 should pass a request to the object "SecondActor" to create an object named "Pivot1" and of type "PivotAttribute". After the "Pivot1" object is created, it becomes the current object. Next, the function "addpivot" of the object "SecondActor" is to be invoked. In operation, the script engine 716 should pass a request to the object "SecondActor" to invoke the function named "addPivot".

In one embodiment, the enhanced scripting language can be written in, converted to, and/or stored in, a binary form. Table 4 provides a list of binary command tags, syntax, etc. for a binary form language that correspond to elements in Table 3. As with the tags described with reference to Table 2, each tag should include at least a Tag ID field, a Tag Length field, and any additional, optional, fields specific to the particular tag.

TABLE 4

| TYPE | Tag ID | EXPLANATION |
|---|---|---|
| Invoke Function of Referenced Object | CALL | This tag indicates a function of an existing object is to be invoked, and includes two string tags. The first string corresponds to the object name and the second string corresponds to the function name. These tags are followed by zero or more primitive data type tags corresponding to parameters. |
| Create Structure | NAME | This tag includes a structure name string tag followed by zero or more primitive tags that indicate the data that the structure is to hold. Structures may be nested. |
| Reference Object or Structure | USE_ | This tag includes an ASCII string that is the name of the structure or object. First a database of created structures should be searched for the specified name, and if structure is not found then a database of created objects should be searched. |

Script Engine for Enhanced Scripting Language

Figure 22:
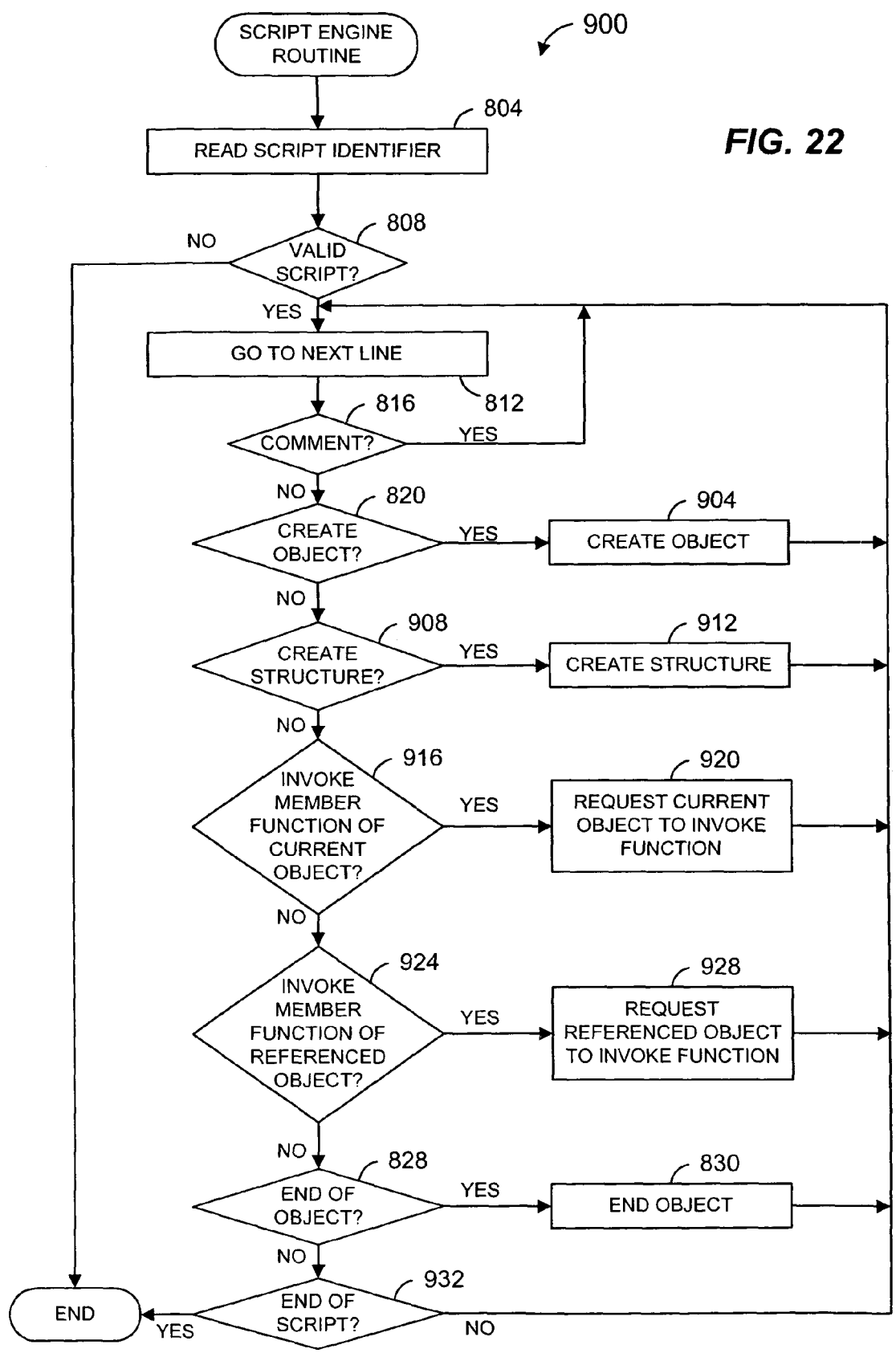
FIG. 22 is a flowchart of another embodiment of a routine for processing a script file.

FIG. 22 is flow diagram illustrating an example script engine routine. The routine 900 may be implemented, for example, by the controller 100 illustrated in FIG. 3. The routine 900 may be implemented, for example, when a base process invokes the script engine 716 and provides an indicator of the script file 708 to the script engine 716. Some of the blocks of the routine 900 may be the same or similar to corresponding blocks of the routine 800 of FIG. 18. Blocks different than those of routine 800 of FIG. 188 will be described below with reference to FIGS. 16 and 22.

If at block 820 the line or tag indicates that an object is to be created, then the request is passed on to the compiled code 704 at block 904, which will described in more detail below. If the line or tag is not indicative of a request to create an object, then at block 908 it may be determined if the line or tag is indicative of a request to create a structure. For example, if the tag is a "NAME" tag, then the tag indicates a request to create a structure. If the line or tag is indicative of a request to create a structure, then a structure is created at block 912, which will described in more detail below.

If the line or tag is not indicative of a request to create a structure, then at block 916 it may be determined if the line or tag is indicative of a request to invoke a member function of the current object. For example, if the tag is a "FUNC" tag, then the tag indicates a request to invoke a member function of the current object. If the line or tag is indicative of a request to invoke a member function of the current object, then a request to invoke the function is passed to the current object at block 920, which will described in more detail below.

If the line or tag is not indicative of a request to invoke a member function of the current object, then at block 924 it may be determined if the line or tag is indicative of a request to invoke a member function of a previously created object. For example, if the tag is a "CALL" tag, then the tag indicates a request to invoke a member function of a previously created object. If the line or tag is indicative of a request to invoke a member function of a previously created object, then a request to invoke the function is passed to the referenced object at block 928, which will described in more detail below.

Figure 23:
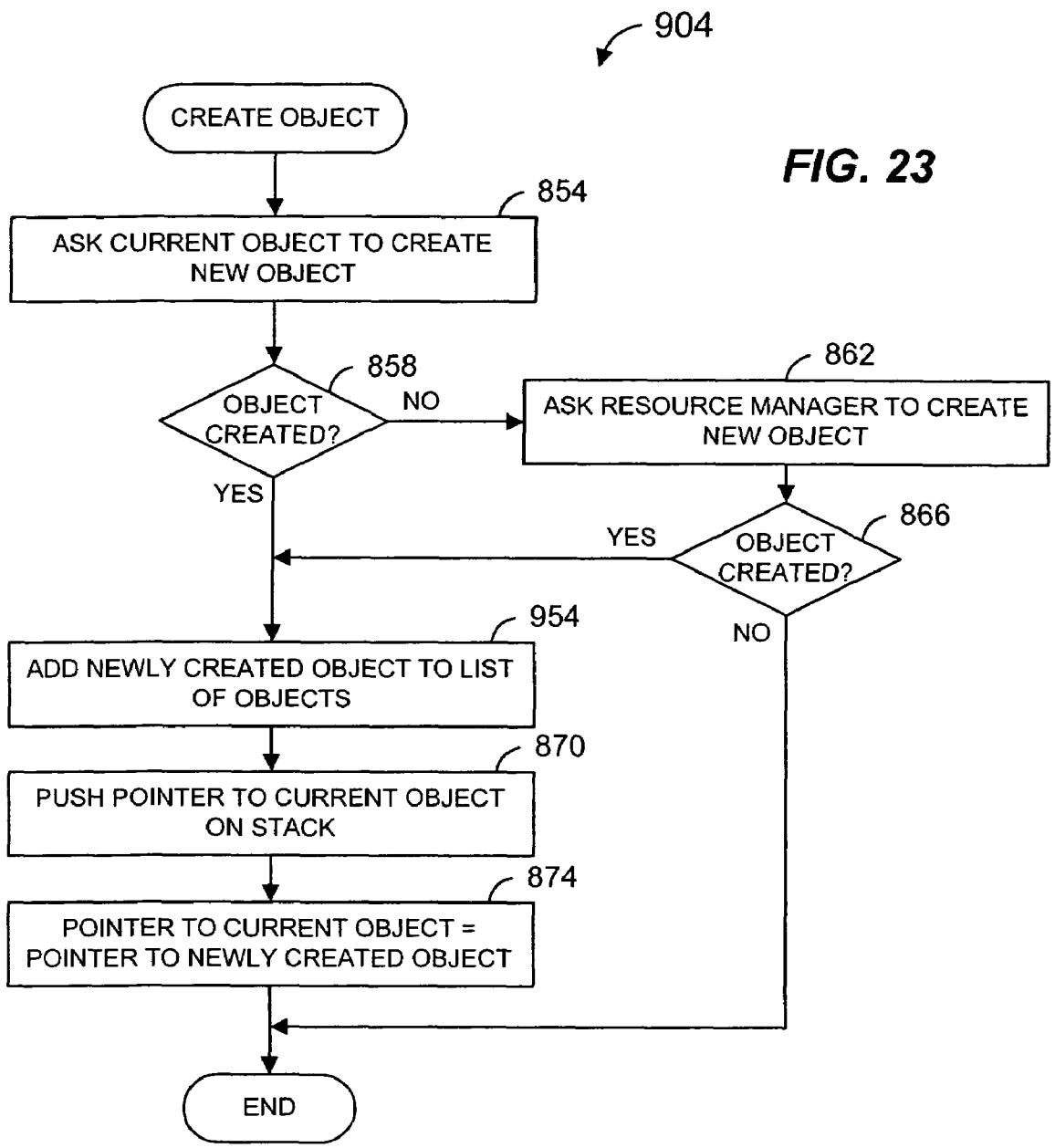
FIG. 23 is a flowchart of another embodiment of a routine for creating a software object.

FIG. 23 is flow diagram illustrating an example script engine routine 904 for creating an object. The routine 904 may be implemented, for example, by the controller 100 illustrated in FIG. 3. Some of the blocks of the routine 904 may be the same or similar to corresponding blocks of the routine 822 of FIG. 19. Blocks different than those of routine 822 of FIG. 19 will be described below with reference to FIG. 16.

If it is determined at blocks 858 or 866 that an object has been created, then at block 954 an indication of the newly created object may be added to a database of objects created during the invocation of the script file 708. The database may include, for example, the name of the object and a pointer to the object. In some embodiments, the database may also include indications of objects created by previous invocations of the script file 708, other script files, the compiled code 704, etc. In one embodiment, the database may include a list of created objects and respective pointers to the objects. Then, the routine may proceed to block 870.

Figure 24:
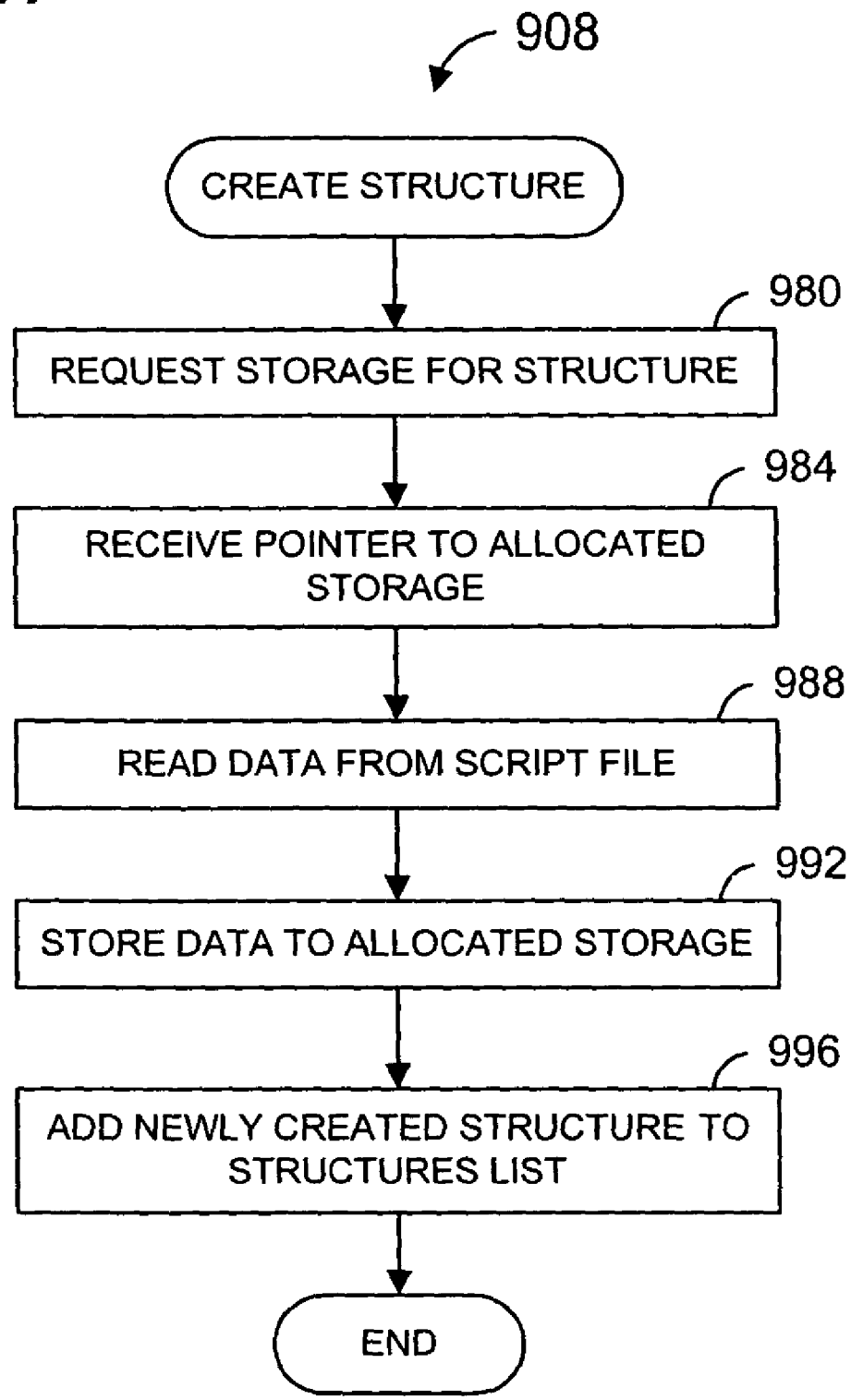
FIG. 24 is a flowchart of an embodiment of a routine for creating a data structure.

FIG. 24 is flow diagram illustrating an example script engine routine 908 for creating a structure. The routine 908 may be implemented, for example, by the controller 100 illustrated in FIG. 3

At block 980, the script engine 716 may request adequate storage for the structure from the compiled code 704. At block

984, the script engine 716 may receive an indicator (e.g., pointer) of allocated storage for the structure. In other embodiments, the script engine 716 may determine storage for the structure on its own or by any other technique including techniques known to those of ordinary skill in the art.

At block 988, the script engine 716 may read data corresponding to the structure from the script file 708. At block 992, the script engine 716 may store the data corresponding to the structure in the allocated storage. At block 996, an indication of the structure may be added to a database of structures created during the invocation of the script file 708. The database may include, for example, the name of the structure and a pointer to the structure. In some embodiments, the database may also include indications of structures created by previous invocations of the script file 708, other script files, the compiled code 704, etc. In one embodiment, the database may comprise a list of created data structures and respective pointers to the structures.

Figure 25:
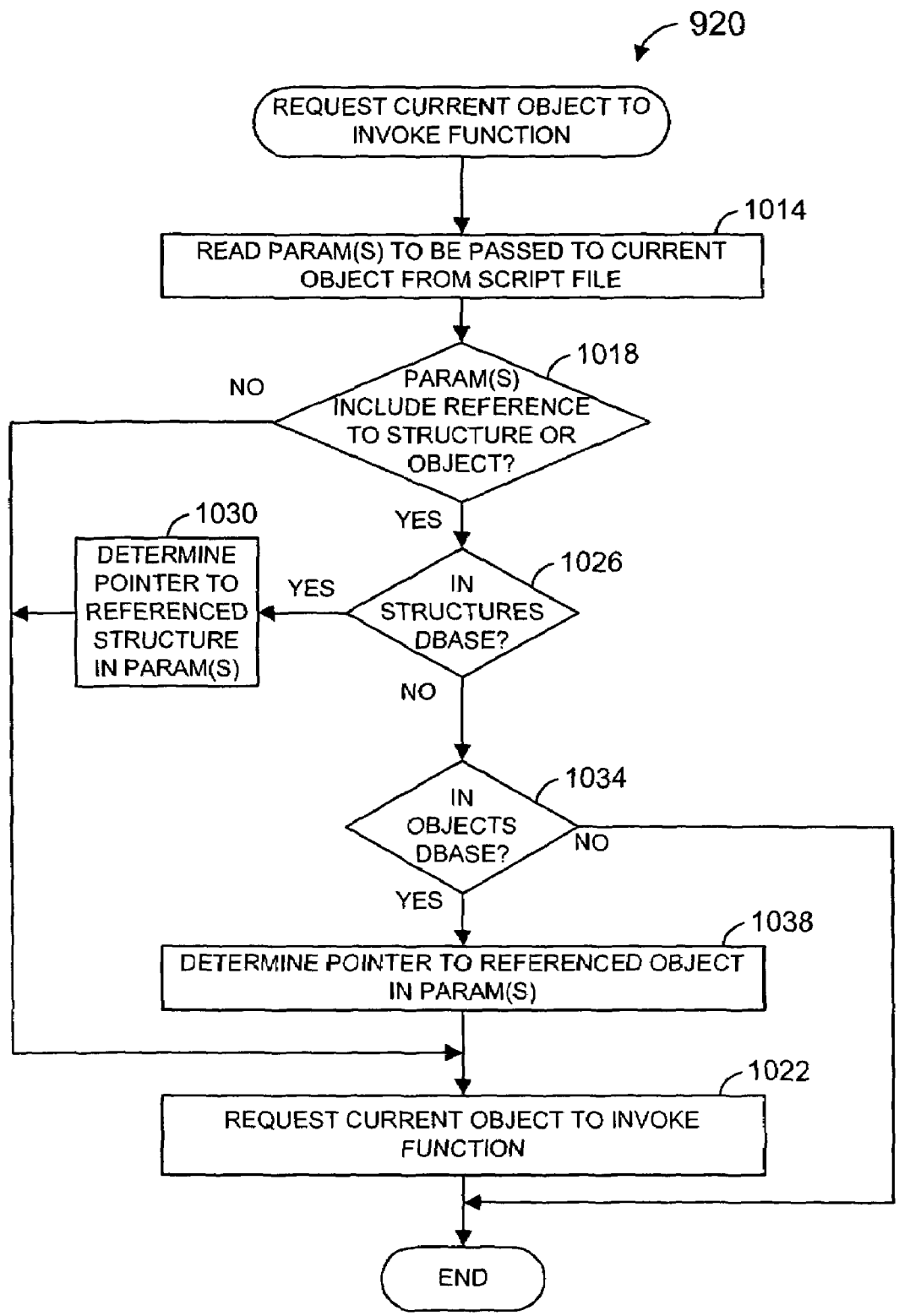
FIG. 25 is a flowchart of another embodiment of a routine for invoking a function of a software object.

FIG. 25 is flow diagram illustrating an example script engine routine 920 for requesting a current object to invoke a function. The routine 920 may be implemented, for example, by the controller 100 illustrated in FIG. 3, and will be described with reference to FIG. 16.

At block 1014, the script engine 716 may read parameters to be passed to the current object for the function. For example, the parameters included in the FUNC tag or between parentheses may be read from the script file 708. At block 1018, it may be determined if the parameters include one or more references to objects and/or structures. For example, it may be determined if the parameters include one or more "&" characters or USE_tags. If the parameters do not include any references to objects or structures, the routine may proceed to block 1022.

At block 1022, the script engine 716 may request the current object to invoke the function. As described above, the current object may be indicated by, for example, a "this" parameter, a pointer, a value stored on a stack, etc. Requesting the current object to invoke the function may include passing to the current object the corresponding function name and parameters indicated by the script file 708. As will be described below, the parameters may also include pointers to one or more structures or objects.

If at block 1018 it is determined that the parameters do include one or more references to objects and/or structures, the routine may proceed to block 1026. At block 1026, it is determined if a reference to a object or structure is in the structures database described above with reference to FIG. 24. If it is in the structures database, the routine may proceed to block 1030, where an indicator (e.g., pointer) of the structure is determined. Then, the flow may proceed to block 1022.

If the reference is not in the structures database, then the flow may proceed to block 1034. At block 1034, it is determined if a reference to a object or structure is in the objects database described above with reference to FIG. 23. If it is not in the objects database, the routine may end. If it is in the database, the routine may proceed to block 1038, where an indicator (e.g., pointer) of the object is determined. Then, the flow may proceed to block 1022. If the parameters include multiple references to objects and/or structures, blocks 1026, 1030, 1026, and 1034 may be repeated an appropriate number of times so that indicators (e.g., pointers) to all of the objects and/or structures may be determined (assuming all of the objects and/or structures are in the objects database or the structures database).

Figure 26:
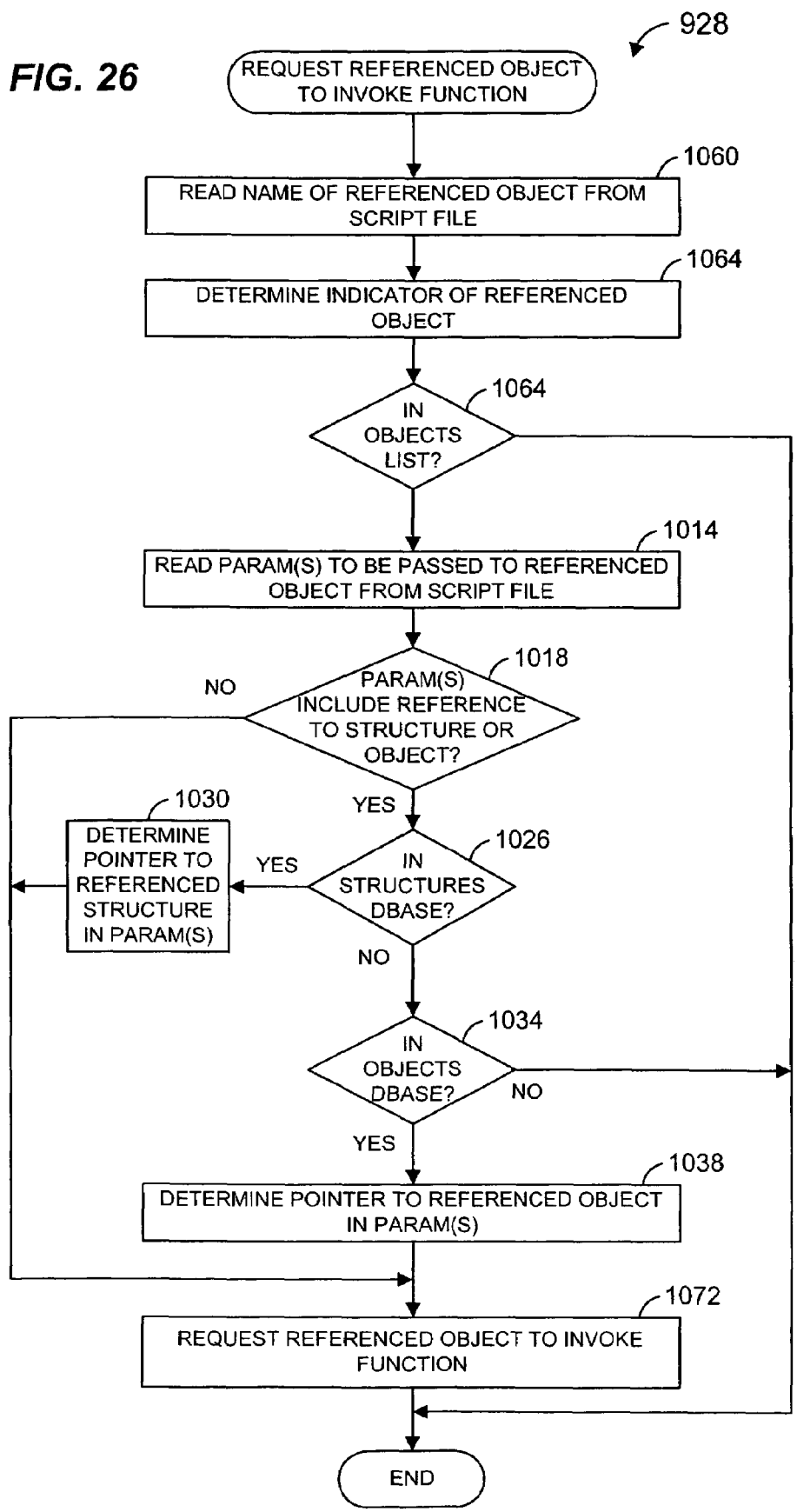
FIG. 26 is a flowchart of yet another embodiment of a routine for invoking a function of a software object.

FIG. 26 is flow diagram illustrating an example script engine routine 920 for requesting a current object to invoke a function. The routine 920 may be implemented, for example, by the controller 100 illustrated in FIG. 3. Some of the blocks of the routine 928 may be the same or similar to corresponding blocks of the routine 920 of FIG. 25. Blocks different than those of routine 920 of FIG. 25 will be described below with reference to FIG. 16.

At block 1060, the name of the object that is to invoke the function is read from the script file 708. For example, the object name prior to the "->" indicator or included in the CALL tag can be read from the script file 708. At block 1064 it may be determined if the object name determined at block 1060 is in the objects database described above with reference to FIG. 23. If the object name is not in the objects database, the routine may end. If the object name is in the objects database, the routine may proceed to block 1068 where an indicator of the object is determined. For example, a pointer corresponding to the object may be read from the objects database. Then, the routine may proceed to block 1014.

After blocks 1018, 1030, and/or 1038, the flow may proceed to block 1072. At block 1072, the script engine 716 may request the object (as indicated by the indicator of block 1068) to invoke the function. Requesting the object to invoke the function may include passing to the referenced object the corresponding function name and parameters indicated by the script file 708 or as determined at blocks 1030 and 1038.

FIG. 27 is a listing of an example script file in a binary format. The left column provides a beginning byte numbers for each line, and the right column provides a textual information corresponding to each line.

In the above description, various methods have been described with reference to flow diagrams. It will be apparent to one of ordinary skill in the art that each of these methods may be implemented, in whole or in part, by software, hardware, and/or firmware. If implemented, in whole or in part, by software, the software may be stored on a tangible medium such as a CD-ROM, a floppy disk, a hard drive, a digital versatile disk (DVD), a ROM, an EEPROM, a flash memory, etc. Further, although the examples described above were described with reference to various flow diagrams, one of ordinary skill in the art will appreciate that many other methods may alternatively be used. For example, the order of execution of the blocks may be changed, and/or some or all of the blocks may be changed, eliminated, or combined.

What is claimed is:

1. A gaming method, comprising:
   receiving a wager from a player via a value input device of a gaming apparatus;
   generating an image representative of a game for display on a display unit of the gaming apparatus;
   executing compiled code associated with play of the game using a processor of the apparatus, the compiled code including code to read data from a file stored in a memory of the gaming apparatus, wherein the file is separate from the compiled code;
   reading, using the compiled code, first uncompiled instruction data from the file, the first uncompiled instruction data indicative of a request to create a first software object associated with play of the game;
   creating the first software object using the compiled code in response to the first uncompiled instruction data;
   reading second uncompiled instruction data from the file, the second uncompiled instruction data indicative of a request to create a second software object associated with play of the game;
   creating the second software object using the compiled code in response to the second uncompiled instruction data;

reading third uncompiled instruction data from the file after creation of the second software object, wherein the third uncompiled instruction data includes a reference to the first software object, wherein the third uncompiled instruction data is indicative of a request to perform an operation associated with play of the game and associated with the first software object;

performing, in response to the third uncompiled instruction data, the operation indicated by the third uncompiled instruction data using the compiled code; and determining a value payout associated with an outcome of the game.

2. A gaming method according to claim 1, further comprising:

saving a name of the first software object in a database of created software objects using the compiled code;

saving a name of the second software object in the database of created software objects using the compiled code.

3. A gaming method according to claim 2, further comprising:

saving a pointer to the first software object in the database of created software objects using the compiled code;

saving a pointer to the second software object in the database of created software objects using the compiled code.

4. A gaming method according to claim 1, wherein performing the operation indicated by the third uncompiled instruction data comprises invoking a function of the first software object.

5. A gaming method according to claim 4, wherein reading the third uncompiled instruction data comprises reading at least one symbol between a name of the first software object and a name of the function that indicates the function is associated with the first software object.

6. A gaming method according to claim 4, wherein reading the third uncompiled instruction data comprises reading a binary tag indicating that a function belonging to a software object is to be invoked.

7. A gaming method according to claim 1, wherein performing the operation indicated by the third uncompiled instruction data comprises invoking a function that references the first software object.

8. A gaming method according to claim 7, wherein reading the third uncompiled instruction data comprises reading at least one symbol indicating the third uncompiled instruction data includes a software object name.

9. A gaming method according to claim 8, further comprising:

searching a database of created software objects for the name of the first software object using the compiled code; and retrieving a pointer to the first software object from the database of created software objects if the name of the first software object is included in the database of created software objects.

10. A gaming method according to claim 8, wherein the at least one symbol indicates the third uncompiled instruction data includes a software object name or a data structure name, wherein the method further comprises:

searching a database of created data structures for the name of the first software object using the compiled code;

searching a database of created software objects for the name of the first software object using the compiled code, if the name is not found in the database of created data structures; and retrieving a pointer to the first software object from the database of created software objects if the name of the first software object is included in the database of created software objects.

11. A gaming method according to claim 7, wherein reading the third uncompiled instruction data comprises reading a binary tag indicating the third uncompiled instruction data includes a software object name.

12. A gaming method according to claim 1, further comprising passing an indicator of the first software object to the compiled code after reading the third uncompiled instruction data from the file.

13. A gaming method according to claim 12, wherein the indicator of the first software object comprises a pointer to the first software object.

14. A gaming method according to claim 1, wherein the game comprises at least one of a poker game, a blackjack game, a slots game, a keno game, and a bingo game.

15. A gaming method according to claim 1, wherein at least one of the first uncompiled instruction data, the second uncompiled instruction data, and the third uncompiled instruction data comprise data in a text format.

16. A gaming method according to claim 1, wherein at least one of the first uncompiled instruction data, the second uncompiled instruction data, and the third uncompiled instruction data comprise data in a binary format.

17. A gaming apparatus, comprising:

a display unit;

a value input device;

a controller operatively coupled to the display unit and the value input device, the controller comprising a processor and a memory operatively coupled to the processor, wherein the memory includes compiled code and a file separate from the compiled code, the controller being programmed to receive wager data from the value input device, the wager data indicative of a wager submitted by a player;

the controller being programmed to generate an image representative of a game for display on the display unit, the controller being programmed according to the compiled code to read first uncompiled instruction data from the file, the first uncompiled instruction data indicative of a request to create a first software object associated with play of the game, the controller being programmed according to the compiled code to create the first software object in response to the first uncompiled instruction data, the controller being programmed according to the compiled code to read second uncompiled instruction data from the file, the second uncompiled instruction data indicative of a request to create a second software object associated with play of the game, the controller being programmed according to the compiled code to create the second software object in response to the second uncompiled instruction data, the controller being programmed according to the compiled code to read third uncompiled instruction data from the file after creation of the second software object, wherein the third uncompiled instruction data includes a reference to the first software object, wherein the third uncompiled instruction data is indicative of a request to perform an operation associated with play of the game and associated with the first software object, the controller being programmed according to the compiled code to perform the operation in response to the third instruction data, and the controller being programmed to determine a value payout associated with an outcome of the game.

18. A gaming method, comprising:

receiving a wager from a player via a value input device of a gaming apparatus;

generating an image representative of a game for display on a display unit of the gaming apparatus;

executing compiled code associated with play of the game using a processor of the apparatus, the compiled code including code to read data from a file stored in a memory of the gaming apparatus, wherein the file is separate from the compiled code;

reading, using the compiled code, first uncompiled instruction data from the file, the first uncompiled instruction data indicative of a request to create a data structure associated with play of the game;

creating the data structure using the compiled code in response to the first uncompiled instruction data;

reading second uncompiled instruction data from the file, wherein the second uncompiled instruction data includes a reference to the data structure, wherein the second uncompiled instruction data is indicative of a request to perform an operation associated with play of the game and associated with the data structure;

performing, in response to the second uncompiled instruction data, the operation indicated by the second uncompiled instruction data using the compiled code and the data structure; and determining a value payout associated with an outcome of the game.

19. A gaming method according to claim 18, wherein reading the first uncompiled instruction data comprises reading at least one symbol indicating the first uncompiled instruction data includes a data structure name corresponding to a data structure to be created.

20. A gaming method according to claim 18, wherein reading the first uncompiled instruction data comprises reading a binary tag indicating that the first uncompiled instruction data includes a data structure name of a data structure to be created.

21. A gaming method according to claim 20, wherein the binary tag indicates the second uncompiled instruction includes a data structure name or a software object name.

22. A gaming method according to claim 18, further comprising saving a name of the data structure in a database of created data structures using the compiled code.

23. A gaming method according to claim 22, further comprising saving a pointer to the data structure in a database of created data structures using the compiled code.

24. A gaming method according to claim 18, wherein performing the operation indicated by the second uncompiled instruction data comprises invoking a function, wherein a name of the data structure is a parameter of the function.

25. A gaming method according to claim 24, wherein reading the second uncompiled instruction data comprises reading at least one symbol indicating that the second uncompiled instruction data includes a data structure name.

26. A gaming method according to claim 25, further comprising:

searching a database of created data structures for the name of the data structure using the compiled code; and retrieving a pointer to the data structure from the database of created software objects if the name of the data structure is included in the database of created data structures.

27. A gaming method according to claim 25, wherein the at least one symbol indicates the second uncompiled instruction data includes a software object name or a data structure name, wherein the method further comprises:

searching a database of created data structures for the name of the data structure using the compiled code;

retrieving a pointer to the data structure from the database of created data structures if the name of the data structure is included in the database of created data structures; and searching a database of created software objects for the name of the data structure using the compiled code, if the name is not found in the database of created data structures.

28. A gaming method according to claim 25, wherein the at least one symbol indicates the second uncompiled instruction includes a data structure name or a software object name.

29. A gaming method according to claim 24, wherein reading the second uncompiled instruction data comprises reading a binary tag indicating that the second uncompiled instruction includes a data structure name.

30. A gaming method according to claim 29, wherein the binary tag indicates the second uncompiled instruction includes a data structure name or a software object name.

31. A gaming method according to claim 18, further comprising passing an indicator of the data structure to the compiled code after reading the second uncompiled instruction data from the file.

32. A gaming method according to claim 31, wherein the indicator of the data structure comprises a pointer to the data structure.

33. A gaming method according to claim 18, wherein the game comprises at least one of a poker game, a blackjack game, a slots game, a keno game, and a bingo game.

34. A gaming apparatus, comprising:

a display unit;

a value input device;

a controller operatively coupled to the display unit and the value input device, the controller comprising a processor and a memory operatively coupled to the processor, wherein the memory includes compiled code and a file separate from the compiled code, the controller being programmed to receive wager data from the value input device, the wager data indicative of a wager submitted by a player;

the controller being programmed to generate an image representative of a game for display on the display unit, the controller being programmed according to the compiled code to read first uncompiled instruction data from the file, the first uncompiled instruction data indicative of a request to create a data structure associated with play of the game, the controller being programmed according to the compiled code to create the data structure in response to the first uncompiled instruction data, the controller being programmed according to the compiled code to read second uncompiled instruction data from the file, wherein the second uncompiled instruction data includes a reference to the data structure, wherein the second uncompiled instruction data is indicative of a request to perform an operation associated with play of the game and associated with the data structure, the controller being programmed according to the compiled code to perform the operation in response to the second instruction data using the data structure, and the controller being programmed to determine a value payout associated with an outcome of the game.

* * * * *